(12) United States Patent
Foreman

(10) Patent No.: US 11,459,037 B2
(45) Date of Patent: Oct. 4, 2022

(54) MODULAR UTILITY RACK AND METHOD

(71) Applicant: High Speed Welding, LLC, Wilmington, NC (US)

(72) Inventor: Stuart Foreman, Wilmington, NC (US)

(73) Assignee: High Speed Welding, LLC, Wilmington, NC (US)

( * ) Notice: Subject to any disclaimer, the term of this patent is extended or adjusted under 35 U.S.C. 154(b) by 0 days.

(21) Appl. No.: 16/989,290

(22) Filed: Aug. 10, 2020

(65) Prior Publication Data

US 2021/0039721 A1   Feb. 11, 2021

Related U.S. Application Data

(60) Provisional application No. 62/884,190, filed on Aug. 8, 2019.

(51) Int. Cl.
*B62D 9/04* (2006.01)
*B62D 33/02* (2006.01)
*B60R 9/04* (2006.01)

(52) U.S. Cl.
CPC ............ *B62D 33/0207* (2013.01); *B60R 9/04* (2013.01)

(58) Field of Classification Search
CPC ..... B60R 9/00; B60R 9/05; B60P 3/40; B62D 33/08
USPC .............................................. 224/405; 296/3
See application file for complete search history.

(56) References Cited

U.S. PATENT DOCUMENTS

| 4,152,020 A | * | 5/1979 | Brown ...................... B60P 3/40 |
| | | | 224/403 |
| 4,267,948 A | * | 5/1981 | Lewis ...................... B60R 9/00 |
| | | | 211/191 |
| 4,398,763 A | * | 8/1983 | Louw ..................... B62D 33/02 |
| | | | 224/309 |
| 5,282,560 A | * | 2/1994 | Ozog ........................ B60R 9/05 |
| | | | 224/316 |
| D463,358 S | * | 9/2002 | Thomas ...................... D12/406 |
| 7,641,251 B1 | * | 1/2010 | Stepanians ................ B60P 3/40 |
| | | | 296/3 |
| 2002/0163214 A1 | * | 11/2002 | Carter ...................... B60R 9/00 |
| | | | 296/3 |

\* cited by examiner

*Primary Examiner* — Corey N Skurdal
(74) *Attorney, Agent, or Firm* — Ward and Smith, P. A.; Ryan K. Simmons

(57) ABSTRACT

A modular utility rack including a pair of opposing front top rails; a front cross member arranged between the pair of opposing front top rails and connected to each top rail of the pair of opposing front top rails; a second cross member arranged between the pair of opposing front top rails and connected to each top rail of the pair of opposing front top rails; a pair of opposing rear top rails; a rear cross member arranged between the pair of opposing rear top rails and connected to each top rail of the pair of opposing rear top rails; a pair of front legs; a pair of rear legs; and a pair of opposing bed rails, wherein each leg of the pair of front legs may be attached to a front top rail and to a bed rail and each leg of the pair of rear legs may be attached to a rear top rail and a bed rail.

21 Claims, 27 Drawing Sheets

MODULAR UTILITY RACK AND METHOD

RELATED APPLICATIONS

This application is related and claims priority to U.S. Provisional Patent Application Nos.: 62/884,190, entitled "Modular utility rack and Method" filed on Aug. 8, 2019 the application of which is incorporate herein by reference in its entirety.

TECHNICAL FIELD

The presently disclosed subject matter relates generally to utility racks, and more particularly to a modular utility rack and method.

BACKGROUND

Typical pickup truck bed utility racks may be designed to fit a certain model and/or size truck bed. For example, there may be different utility racks for a 6-foot bed vs. an 8-foot bed, or different utility racks for a GMC vs. a Ford vs. a Dodge truck. Accordingly, a manufacturer, supplier and/or retailer of truck bed utility racks must maintain a large inventory of racks to accommodate all the deferent brands and/or sizes of truck beds. Further, typical truck bed utility racks are manufactured and sold as a single one-piece structure, which is bulky to ship, handle, and store, thus increasing costs (shipping/storage) and limiting inventory (numbers and styles) that can be stored on-site of a retailer. Consequently, with respect to truck bed utility racks, the amount of options/customization available to a customer may be limited.

SUMMARY

In one embodiment, a modular utility rack is provided. The modular utility rack may include a pair of opposing front top rails; a front cross member arranged between the pair of opposing front top rails and connected to each top rail of the pair of opposing front top rails; a second cross member arranged between the pair of opposing front top rails and connected to each top rail of the pair of opposing front top rails; a pair of opposing rear top rails; a rear cross member arranged between the pair of opposing rear top rails and connected to each top rail of the pair of opposing rear top rails; a pair of front legs; a pair of rear legs; and a pair of opposing bed rails, wherein each leg of the pair of front legs may be attached to a front top rail and to a bed rail and each leg of the pair of rear legs may be attached to a rear top rail and a bed rail. The modular utility rack may further include one or more bed rail mounting brackets attached to a bed rail and configured to mount the utility rack to a bed of truck. The each of the mounting brackets may be attached to a bed rail in close proximity to where a front leg or a rear leg attaches to the bed rail. One or more of the front, middle, or rear cross member may be removable. Each rear top rail may include a mounting portion configured to attach the rear cross member to the rear top rail. The rear cross member may include one or more holes at each end and the rear cross member may be connected to the mounting portion by placing a pin through each hole of the one or more holes. The pair of opposing front top rails may include a right front top rail and a left front top rail. The pair of opposing rear top rails may include a right rear top rail and a left rear top rail. The right rear top rail may be connected to the right front top rail and the left rear top rail may be connected to the left front top rail. An end of the right front top rail may include at least one hole near an end and the end of the right front to rail fits inside an interior of the right rear top rail, wherein the right rear top rail may be connected to right front top rail by sliding the right front top rail into the right rear top rail and inserting a fastening device into the hole near the end. The fasting device may be a screw, a bolt, a pin, or other suitable fastener. The pair of opposing bed rails may include a right bed rail and a left bed rail. The pair of front legs may include a right front leg and a left front leg, wherein the right front leg may be attached to the right front top rail and the right bed rail, and the left front leg may be attached to the left front top rail and the left bed rail. The pair of rear legs may include a right rear leg and a left rear leg, wherein the right rear leg may be attached to right rear top rail and the right bed rail, and the left front leg may be attached to the left rear top rail and the left bed rail. Each of the front legs and the rear legs may be attached to the bed rails by a mounting bracket. The pair of opposing bed rails may be attached to a bed of a truck and the pair of opposing front top rails may not be attached to the truck. The modular utility rack may further include at least two bed rail mounting brackets, wherein each bed rail may be attached to the bed of the truck by utilizing one or more bed rail mounting brackets to attach the bed rail to the truck bed. The modular utility rack may further include one or more wind deflectors disposed on the front cross member, wherein the wind deflector may be configured to deviate wind and/or reduce noise vibration.

In another embodiment, a modular utility rack is provided. The modular utility rack may include a pair of opposing front top rails; a front cross member arrangeable between the pair of opposing front top rails and connectable to each top rail of the pair of opposing front top rails; a second cross member arrangeable between the pair of opposing front top rails and connectable to each top rail of the pair of opposing front top rails; a pair of opposing rear top rails; a rear cross member arrangeable between the pair of opposing rear top rails and connectable to each top rail of the pair of opposing rear top rails; a pair of front legs; a pair of rear legs; and a pair of opposing bed rails, wherein each leg of the pair of front legs is attachable to a front top rail and to a bed rail and each leg of the pair of rear legs is attachable to a rear top rail and a bed rail. The modular utility rack may further include one or more wind deflectors disposed on the front cross member, wherein the wind deflector may be configured to deviate wind and/or reduce noise vibration.

BRIEF DESCRIPTION OF THE DRAWINGS

Figure 1:
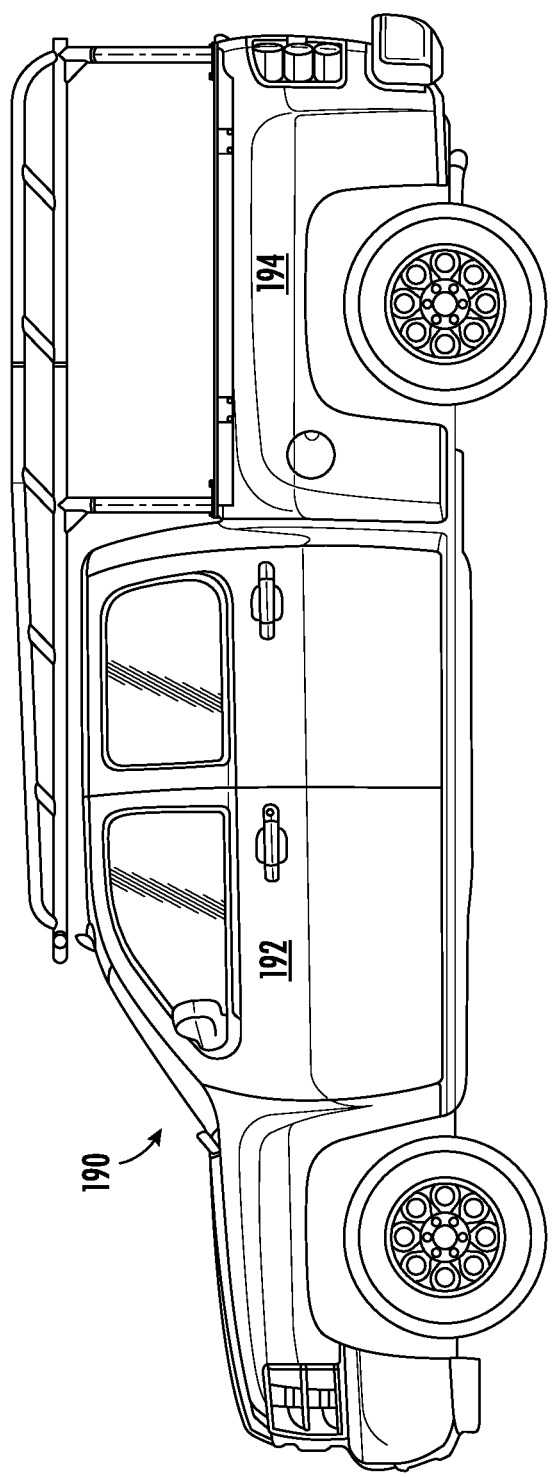
Figure 2:
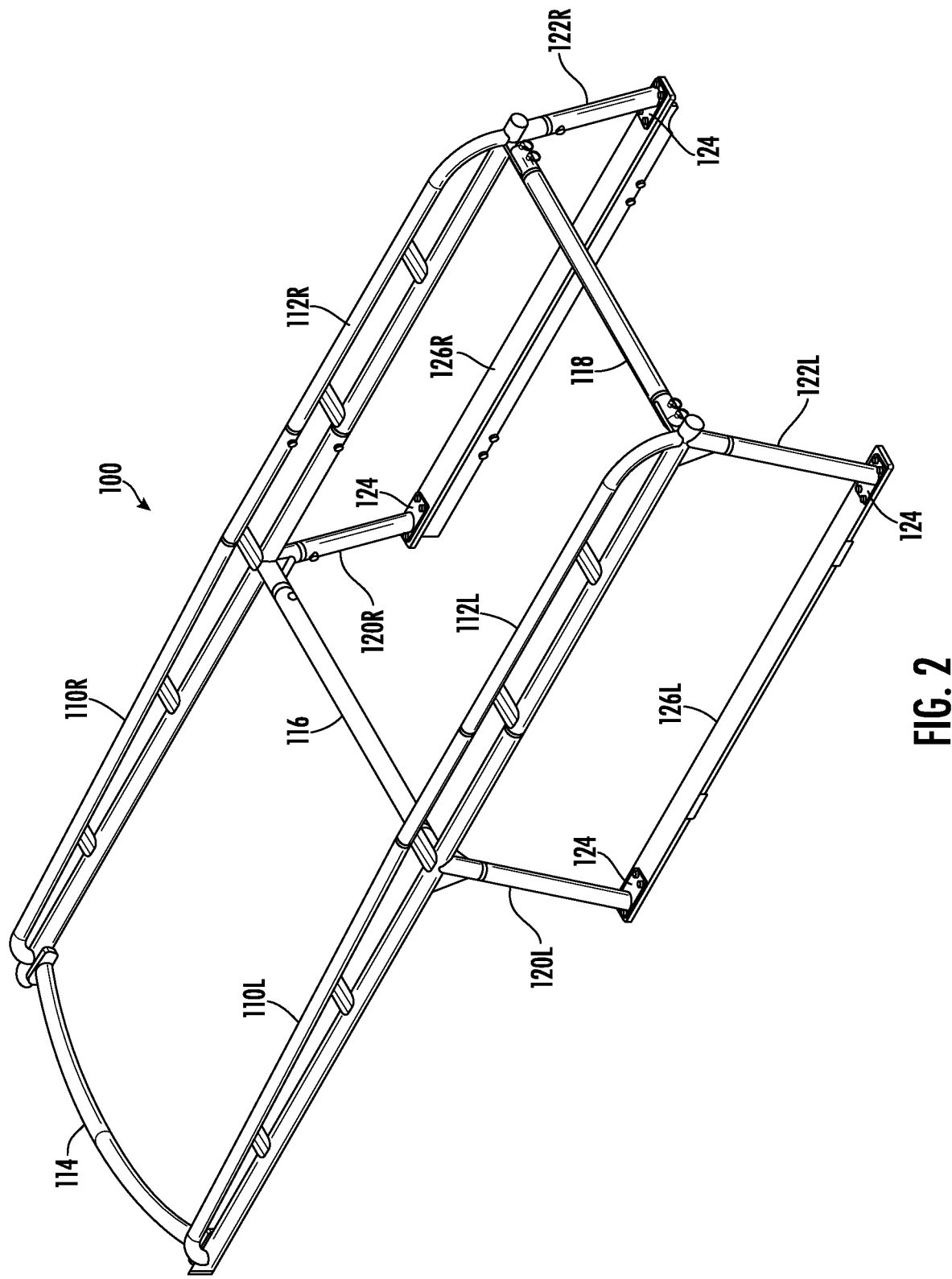
Figure 3:
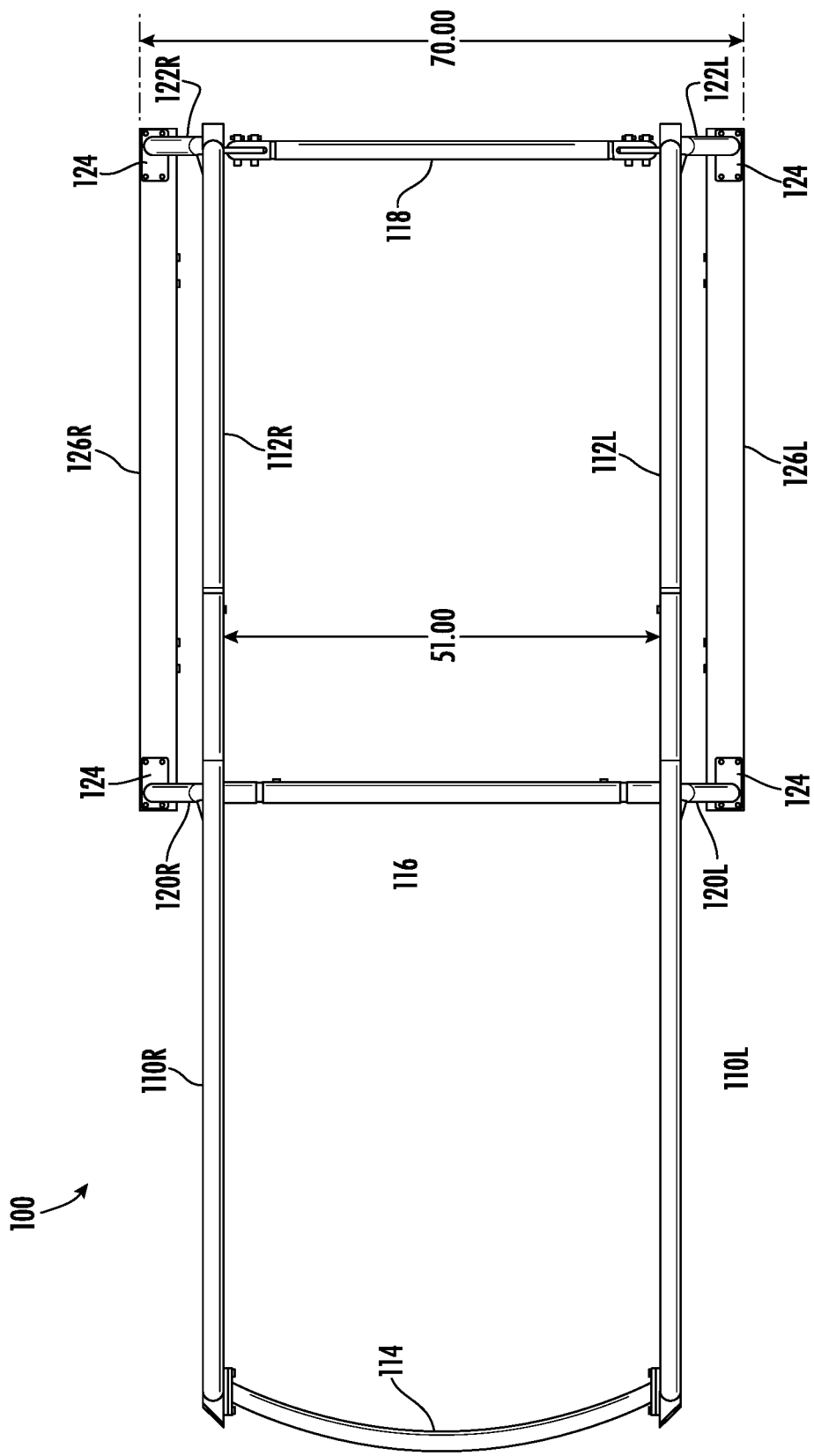
Figure 4:
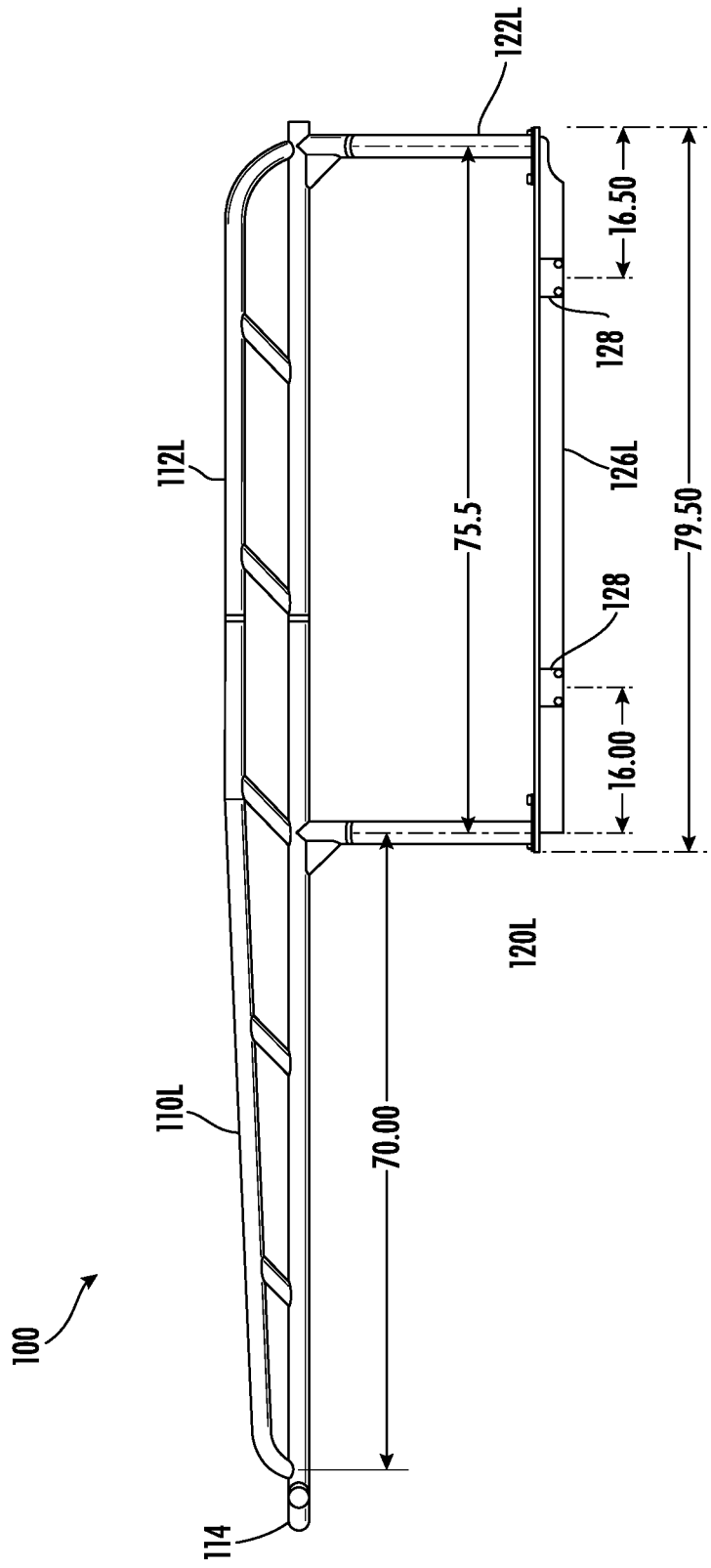
Figure 5:
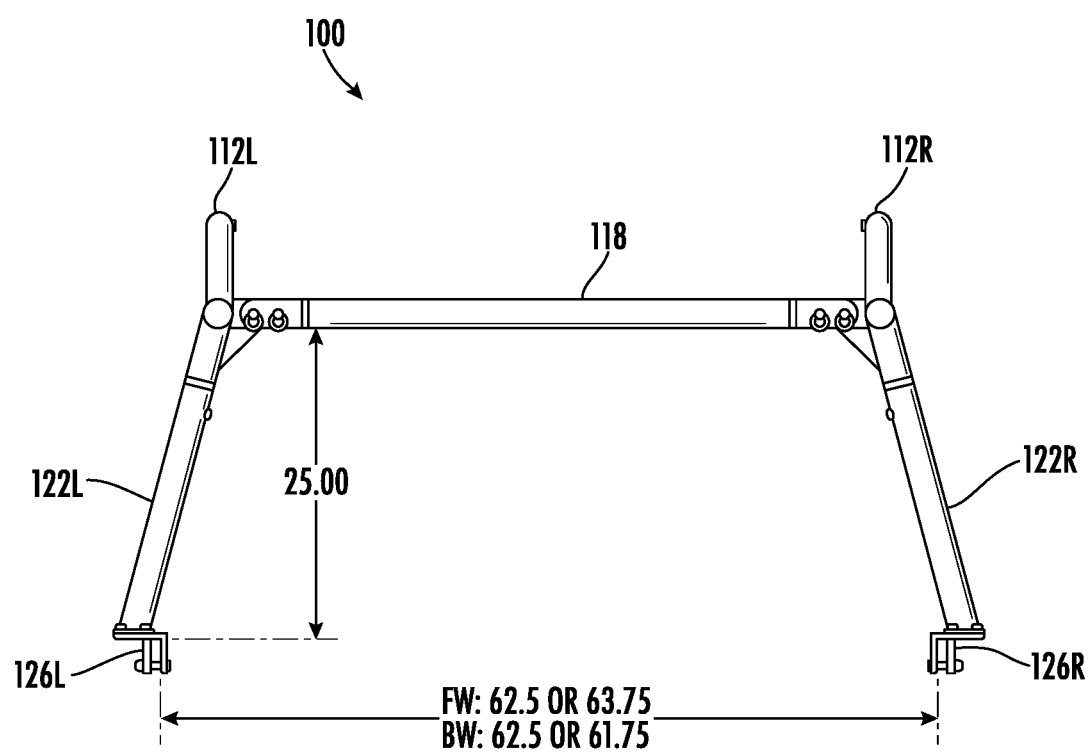
Figure 6:
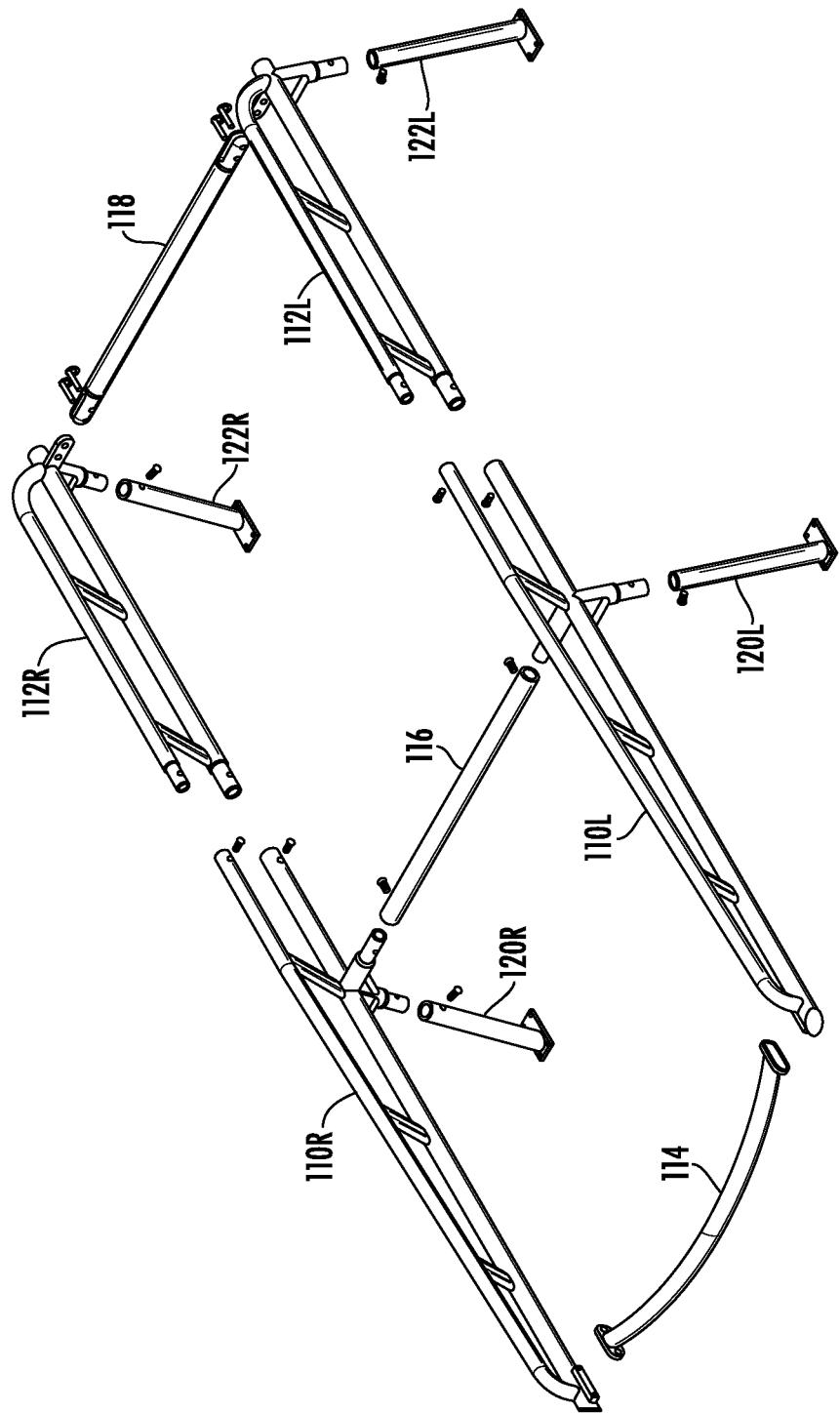
Figure 7:
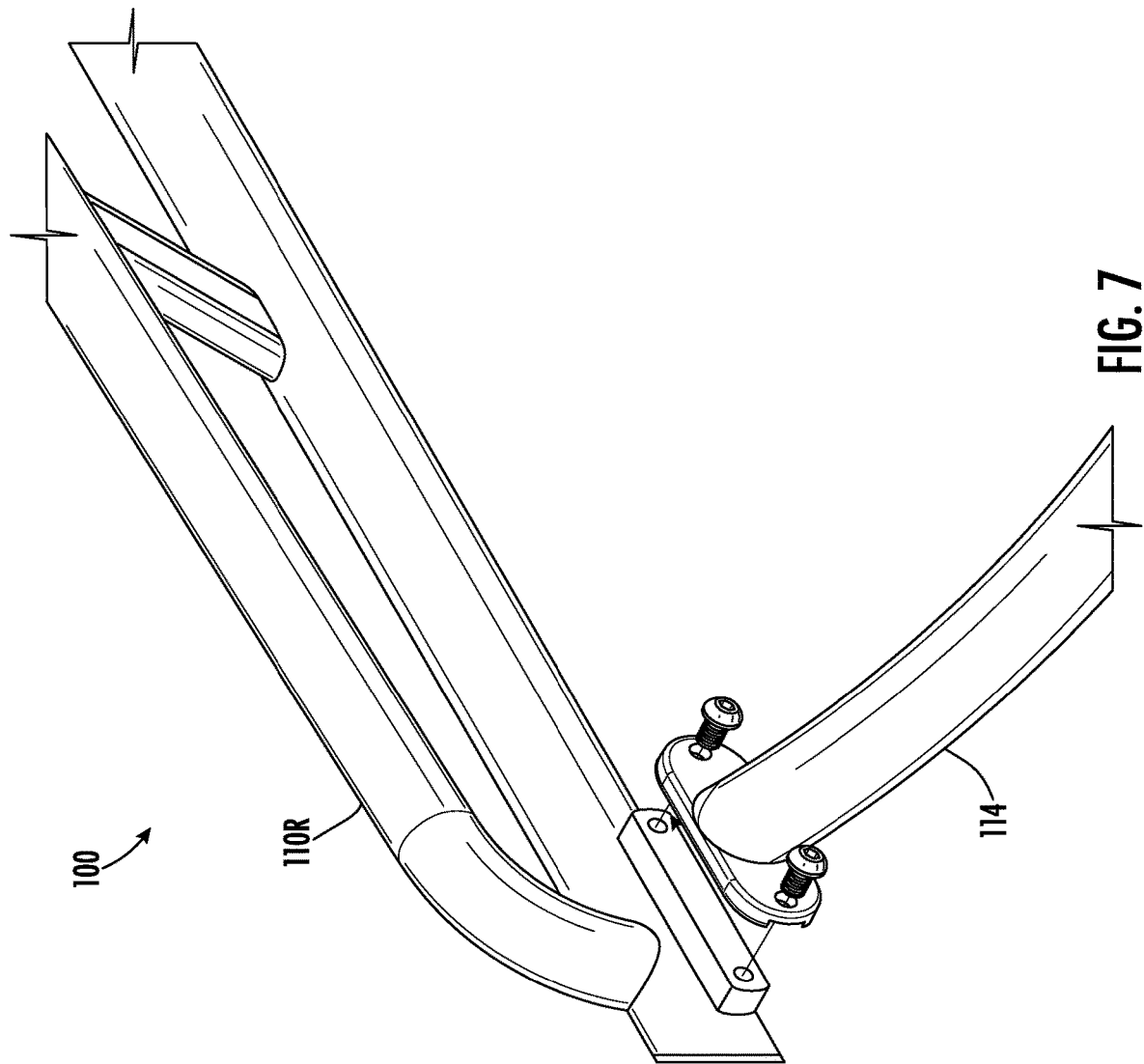
Figure 8:
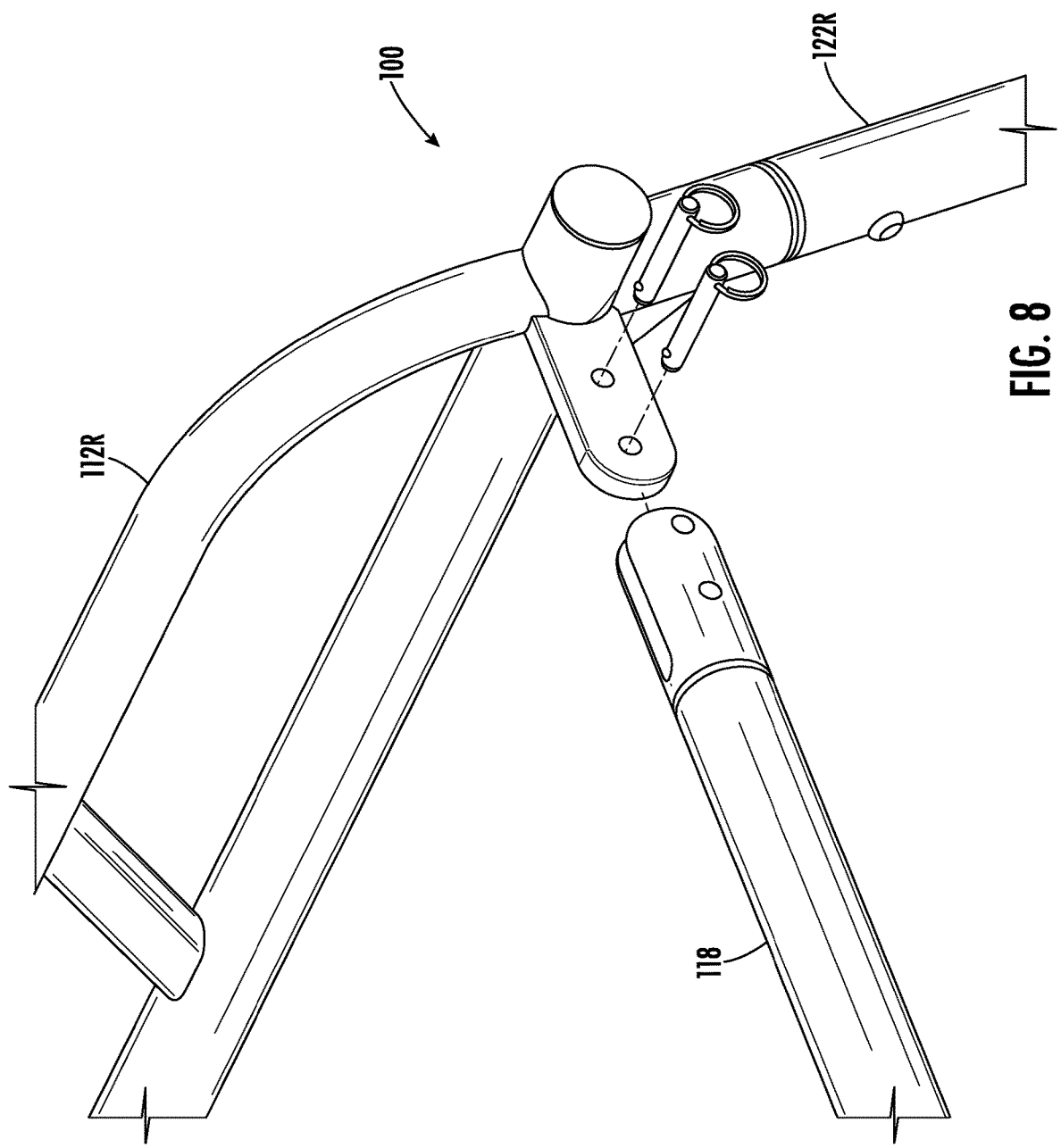
Figure 9:
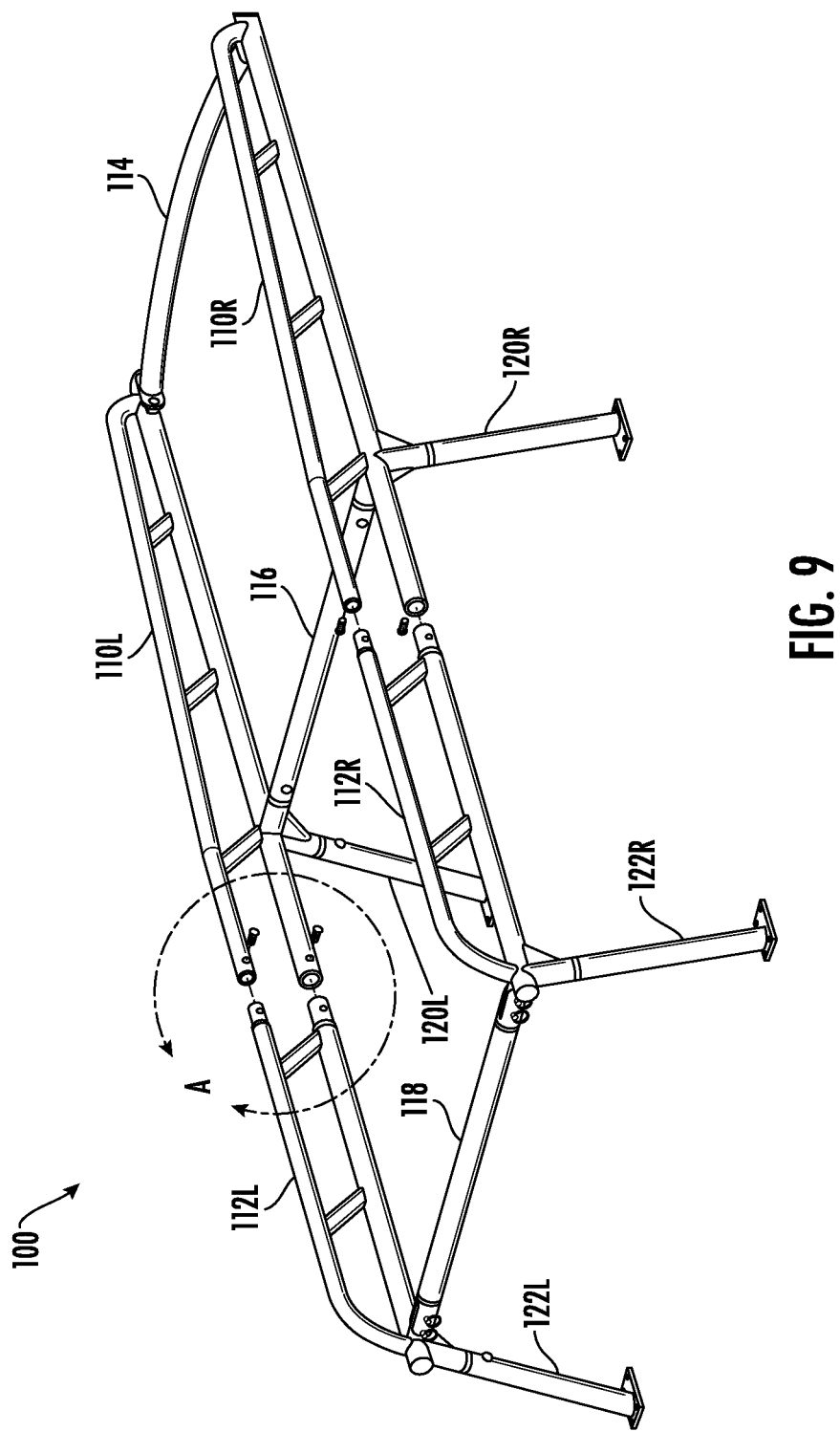
Figure 10:
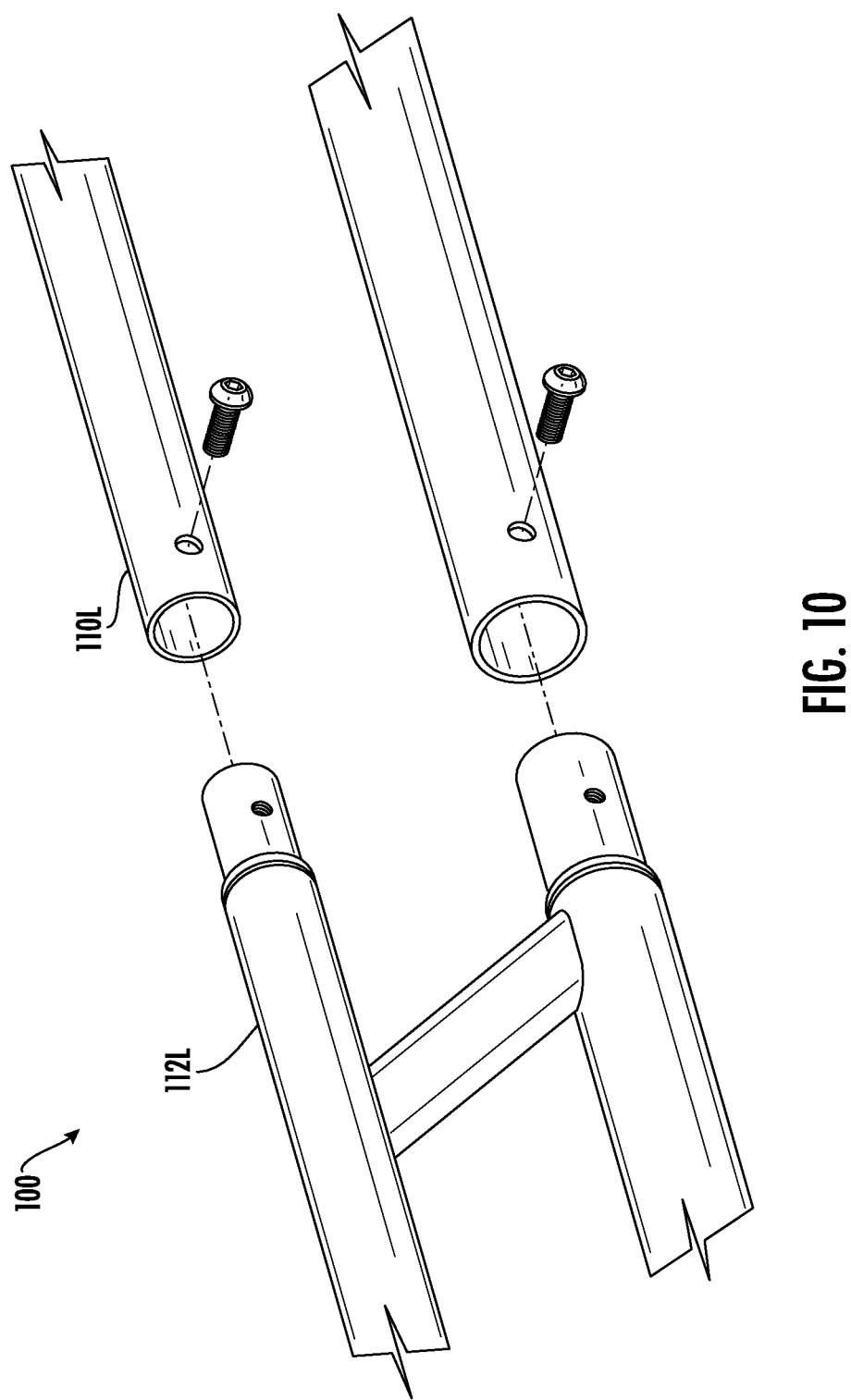
Figure 11:
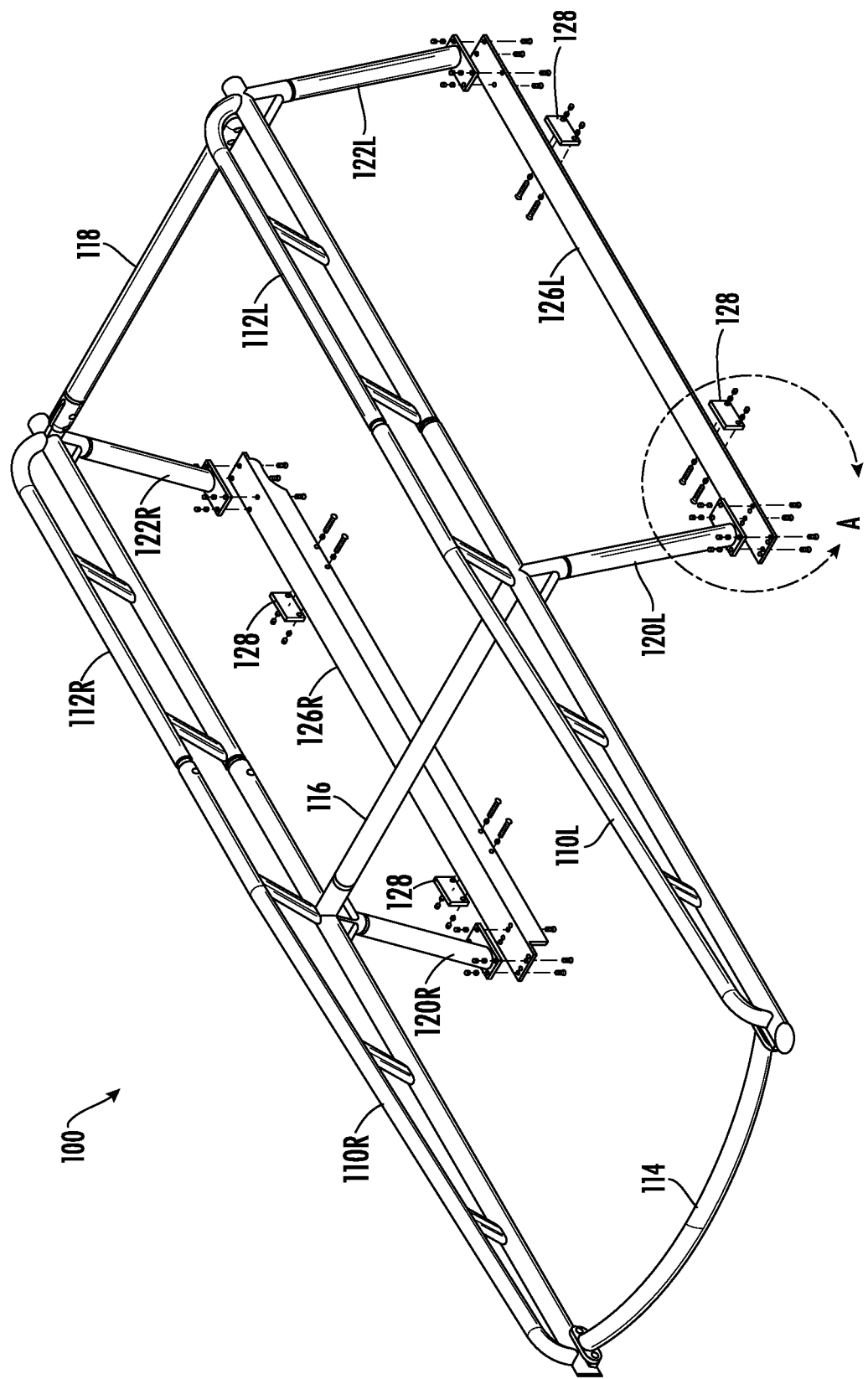
Figure 12:
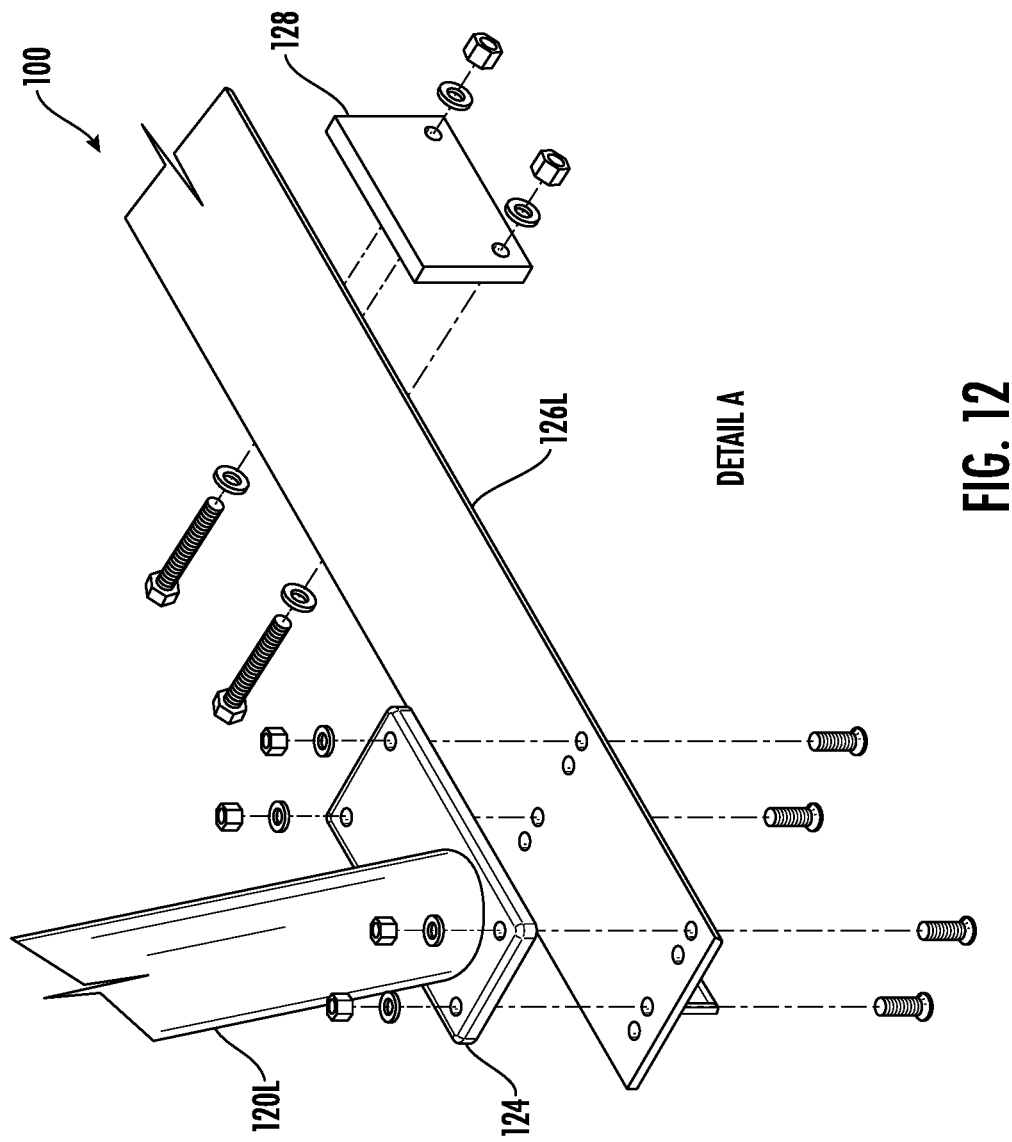
Figure 13:
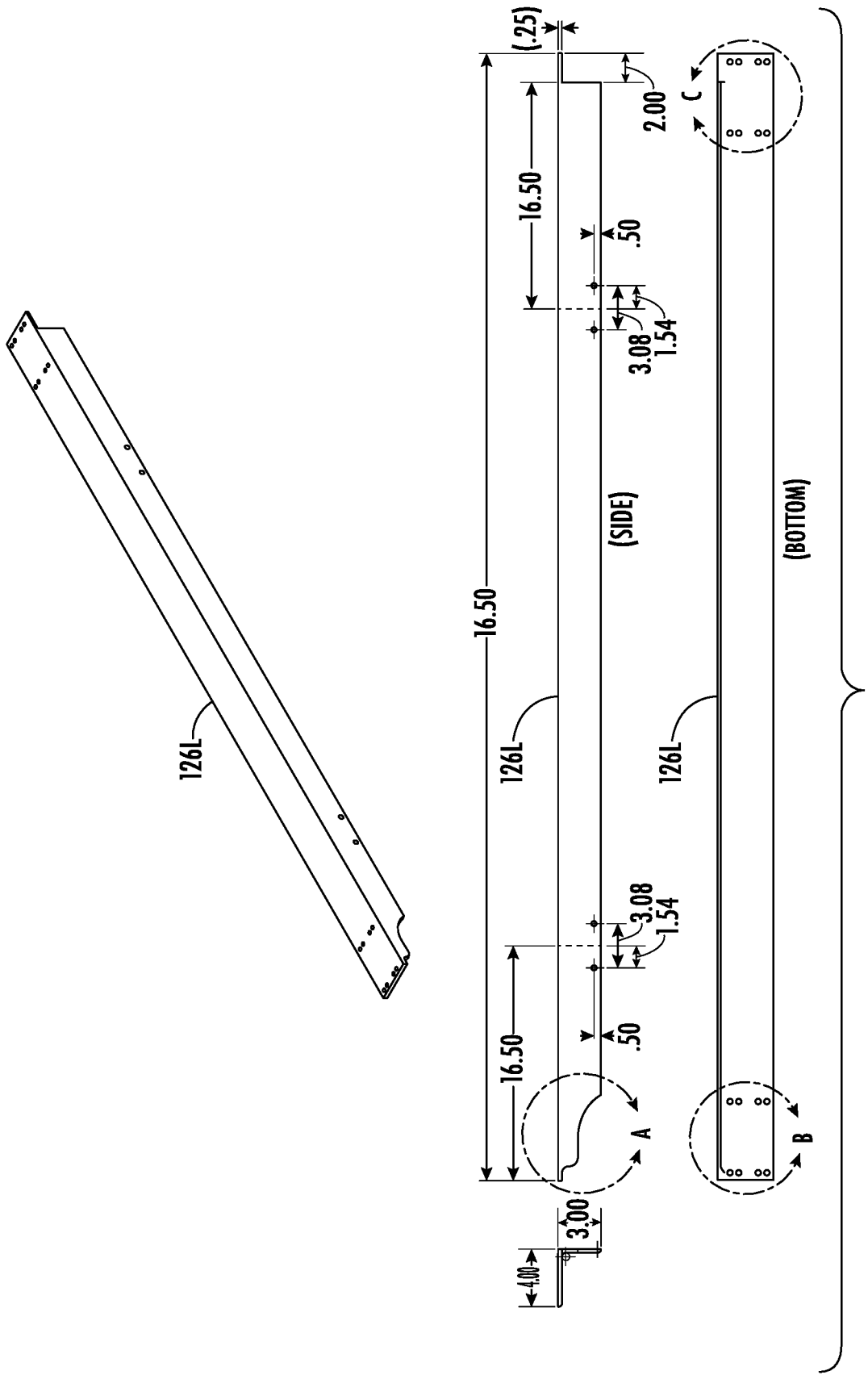
Figure 14:
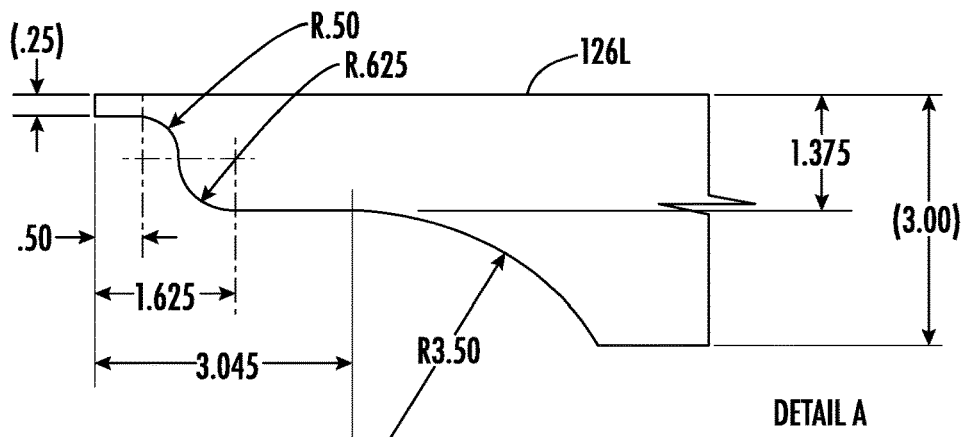
Figure 15:
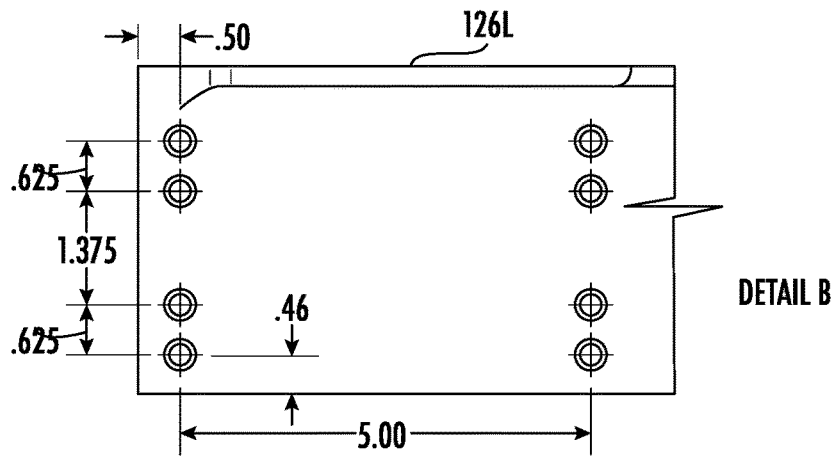
Figure 16:
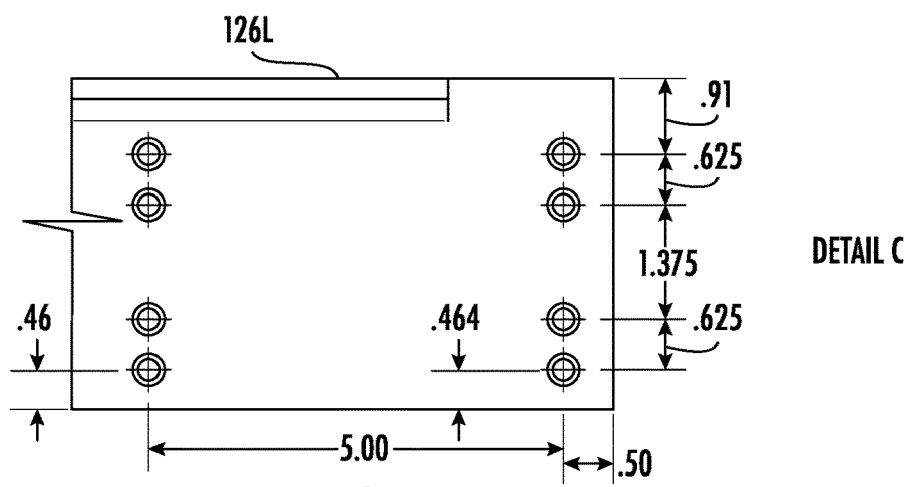
Figure 17:
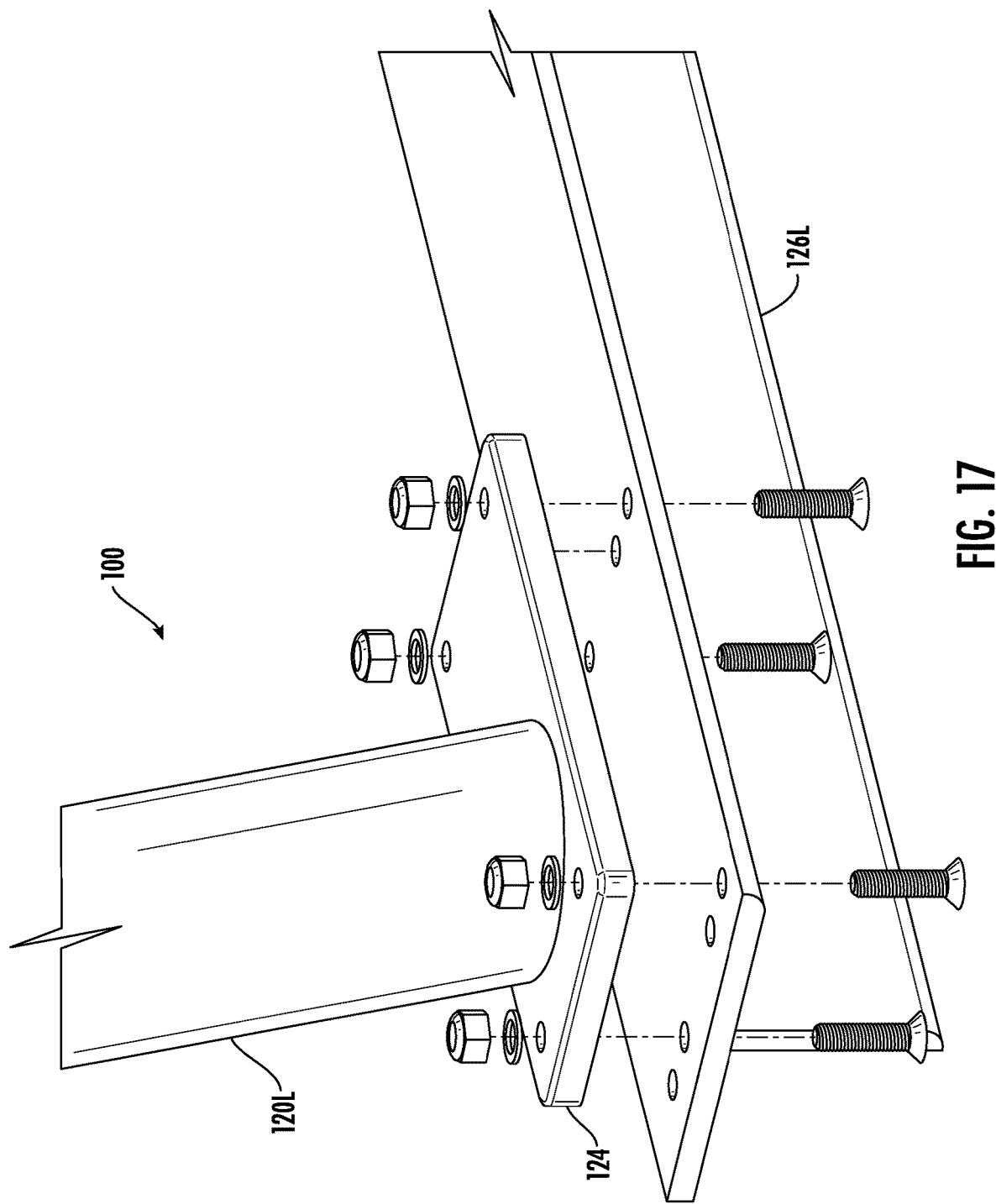
Figure 18:
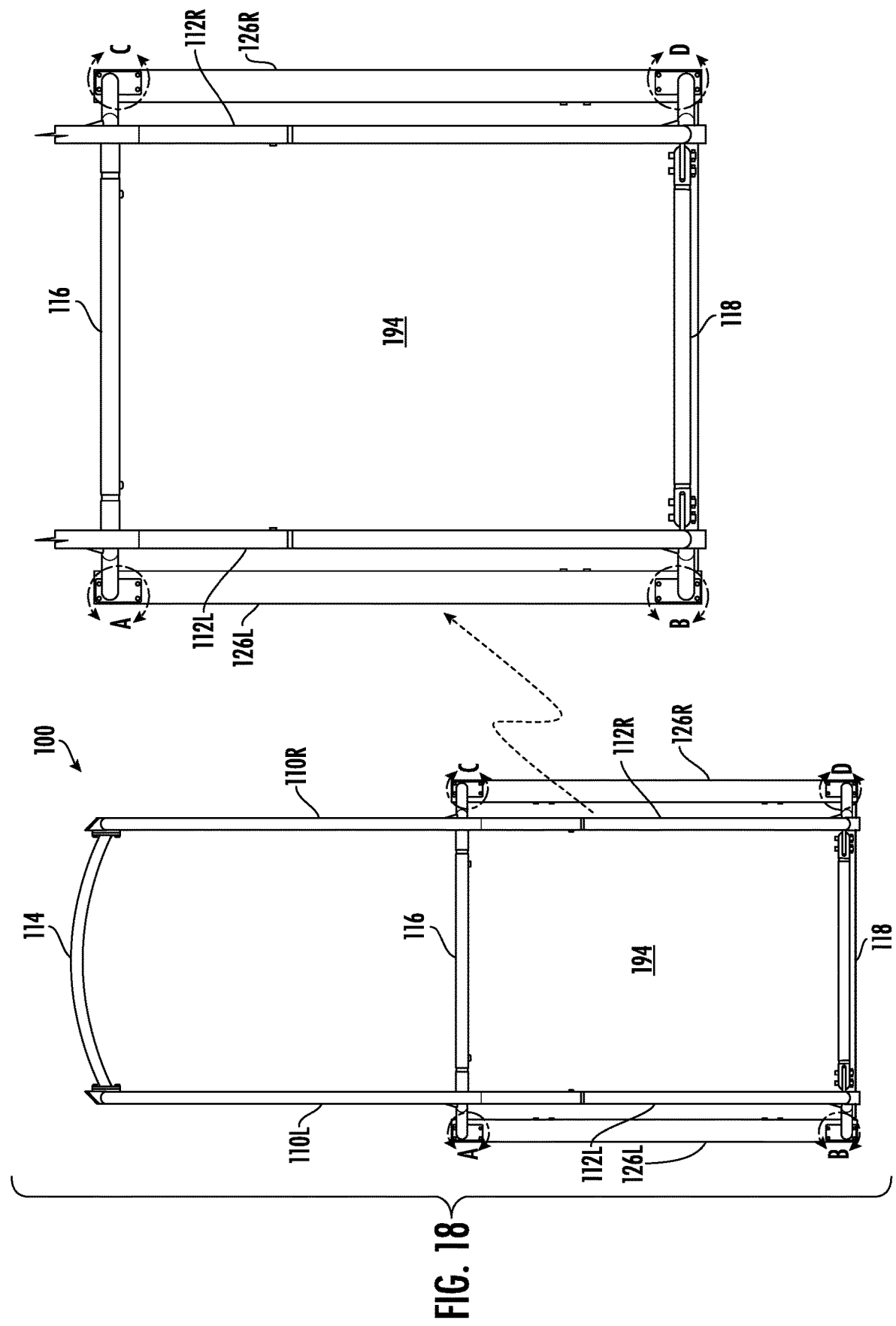
Figure 19:
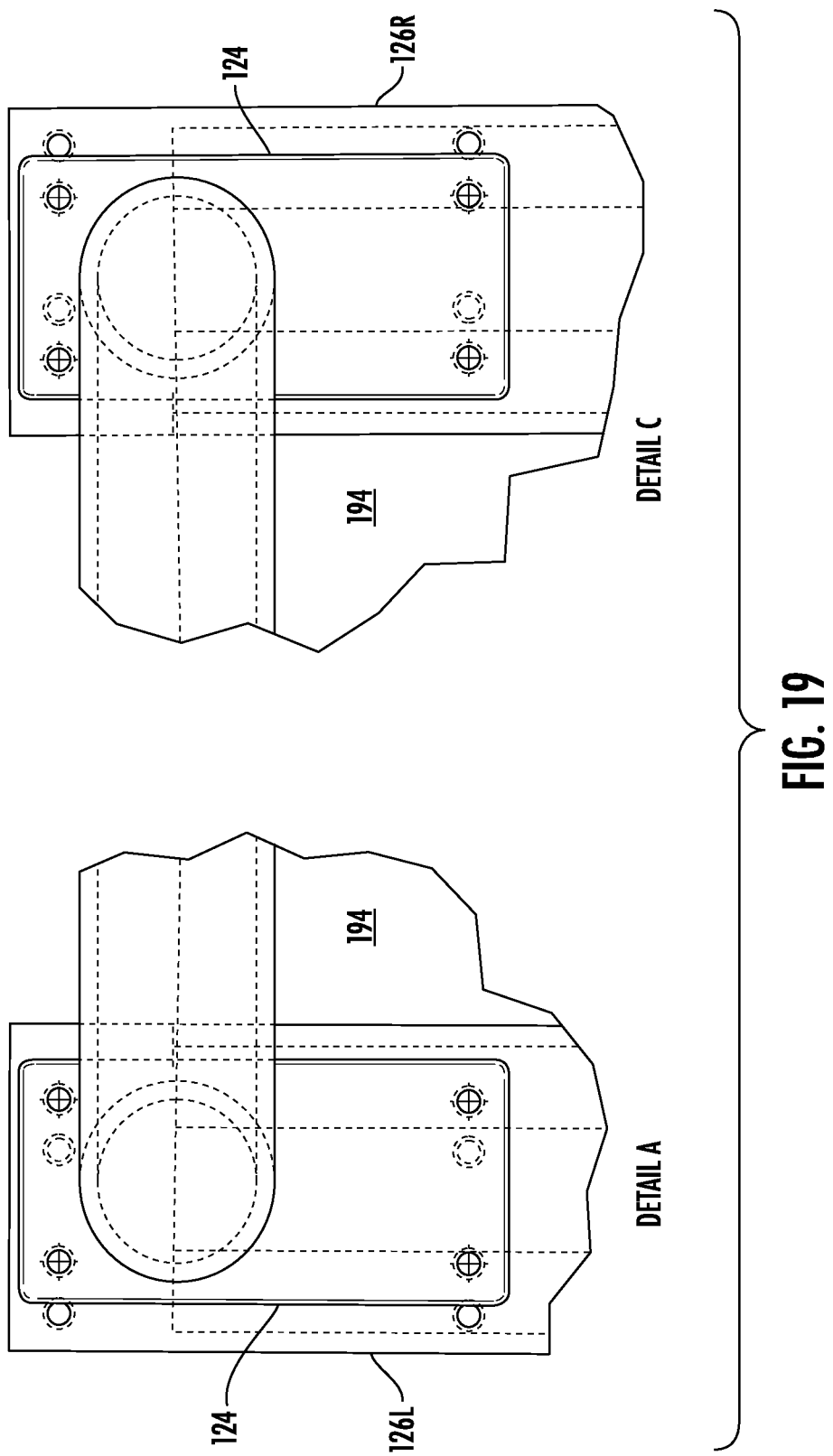
Figure 20:
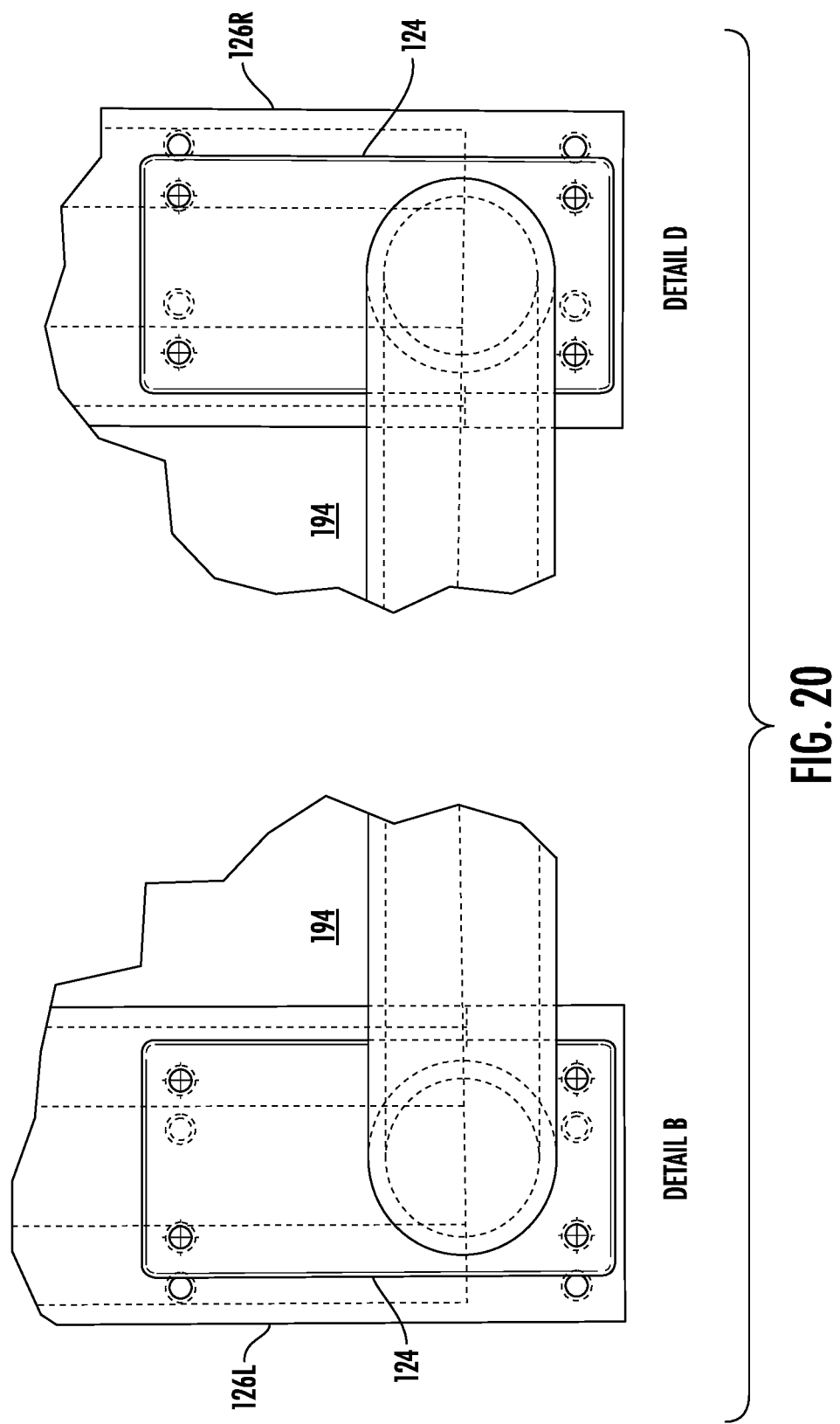
Figure 21:
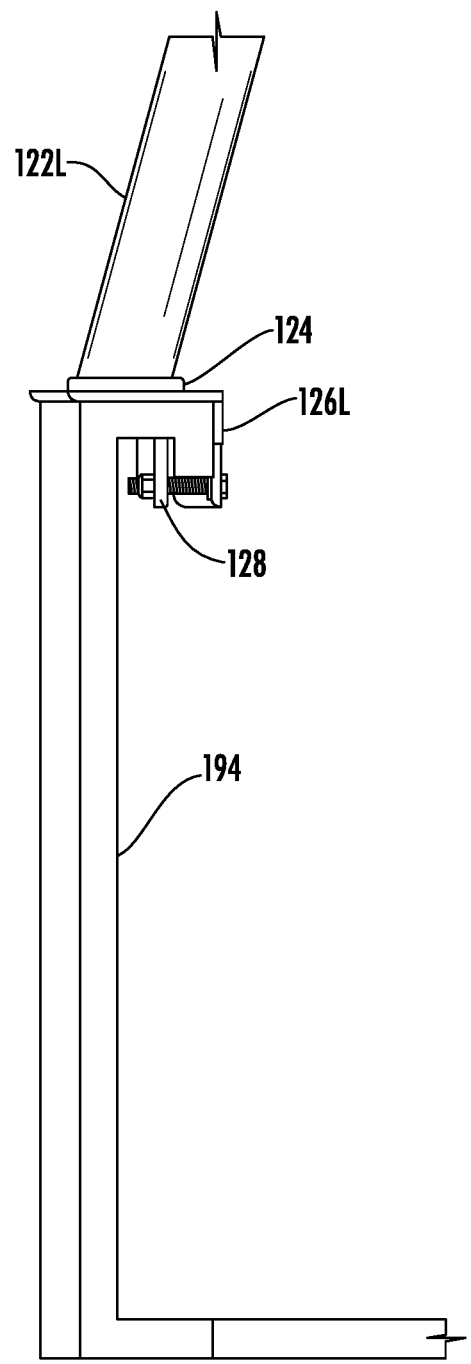
Figure 22:
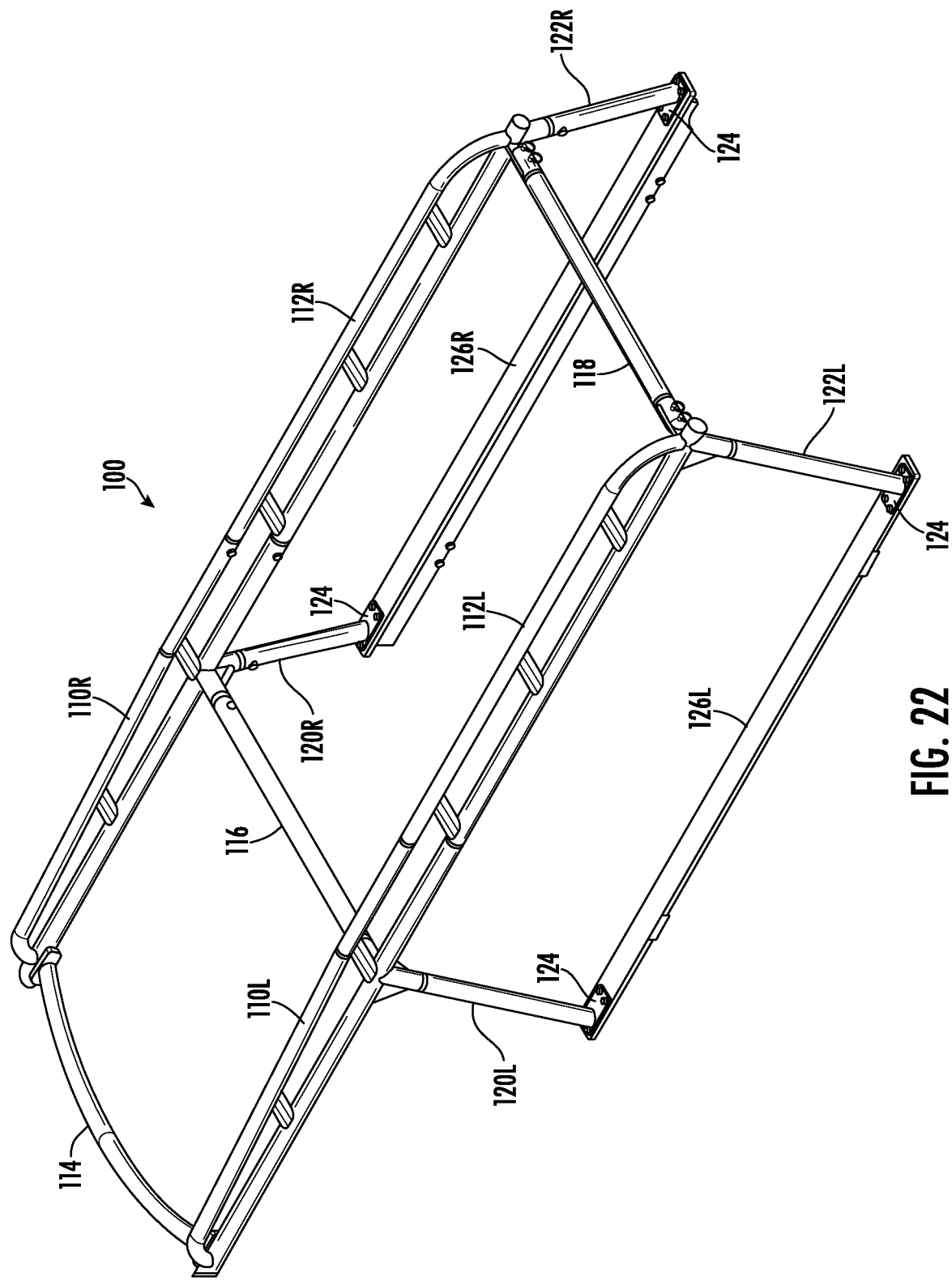
Figure 23:
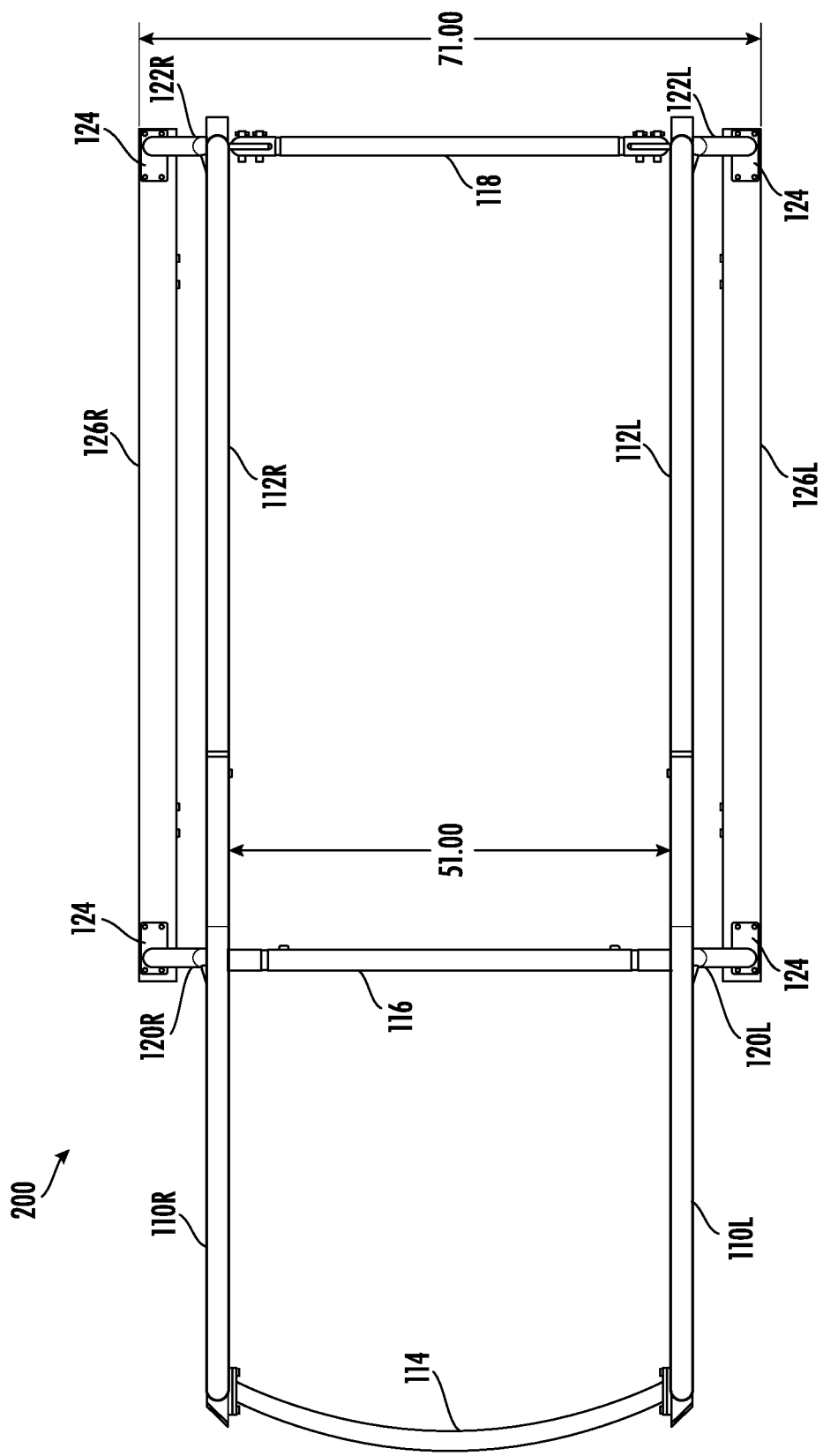
Figure 24:
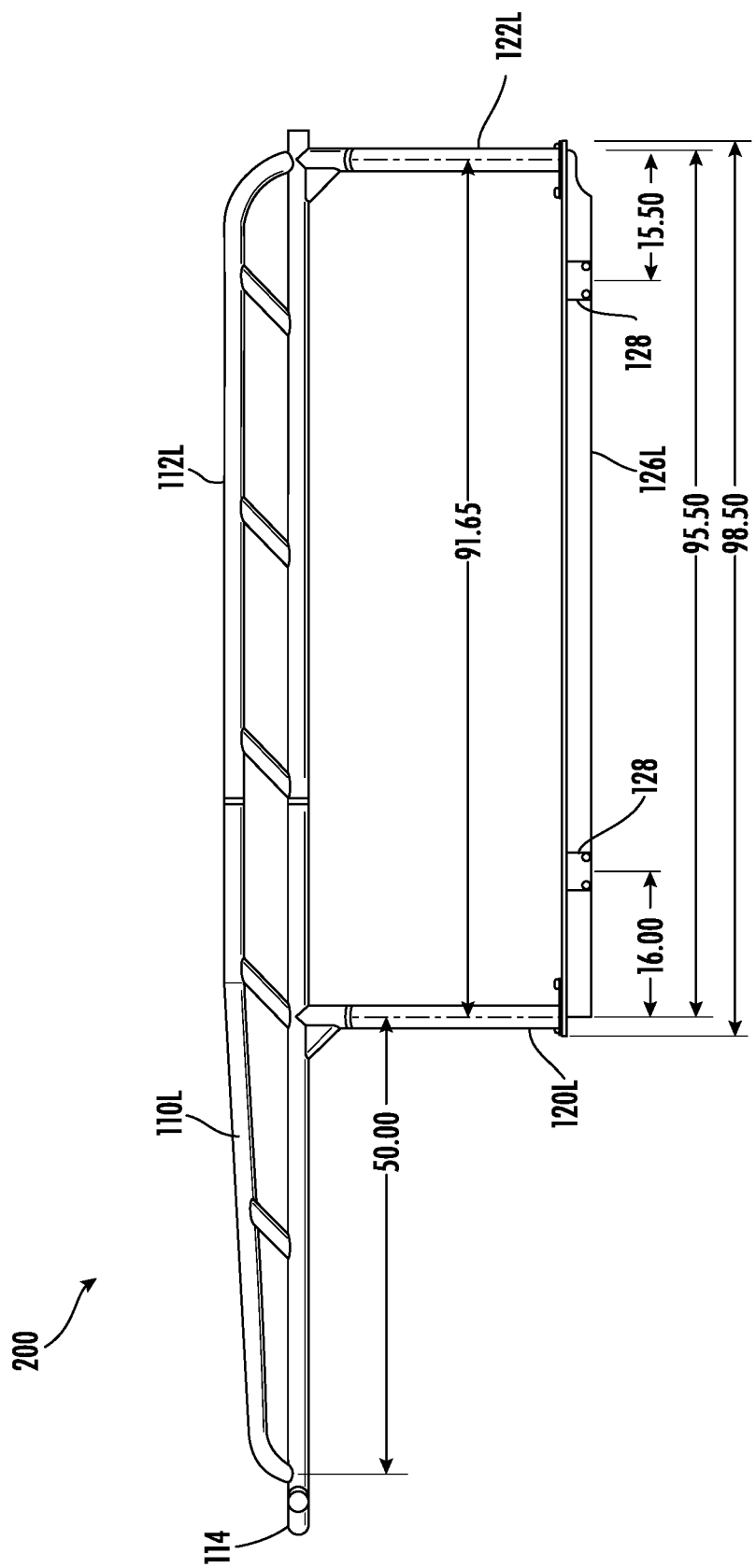
Figure 25:
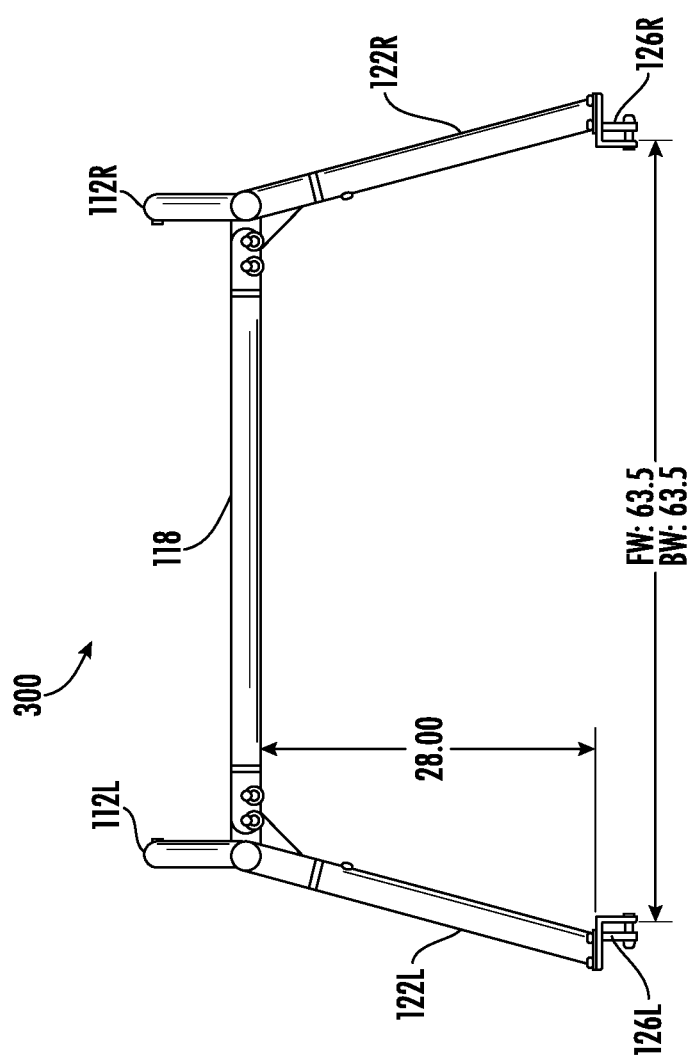
Figure 26:
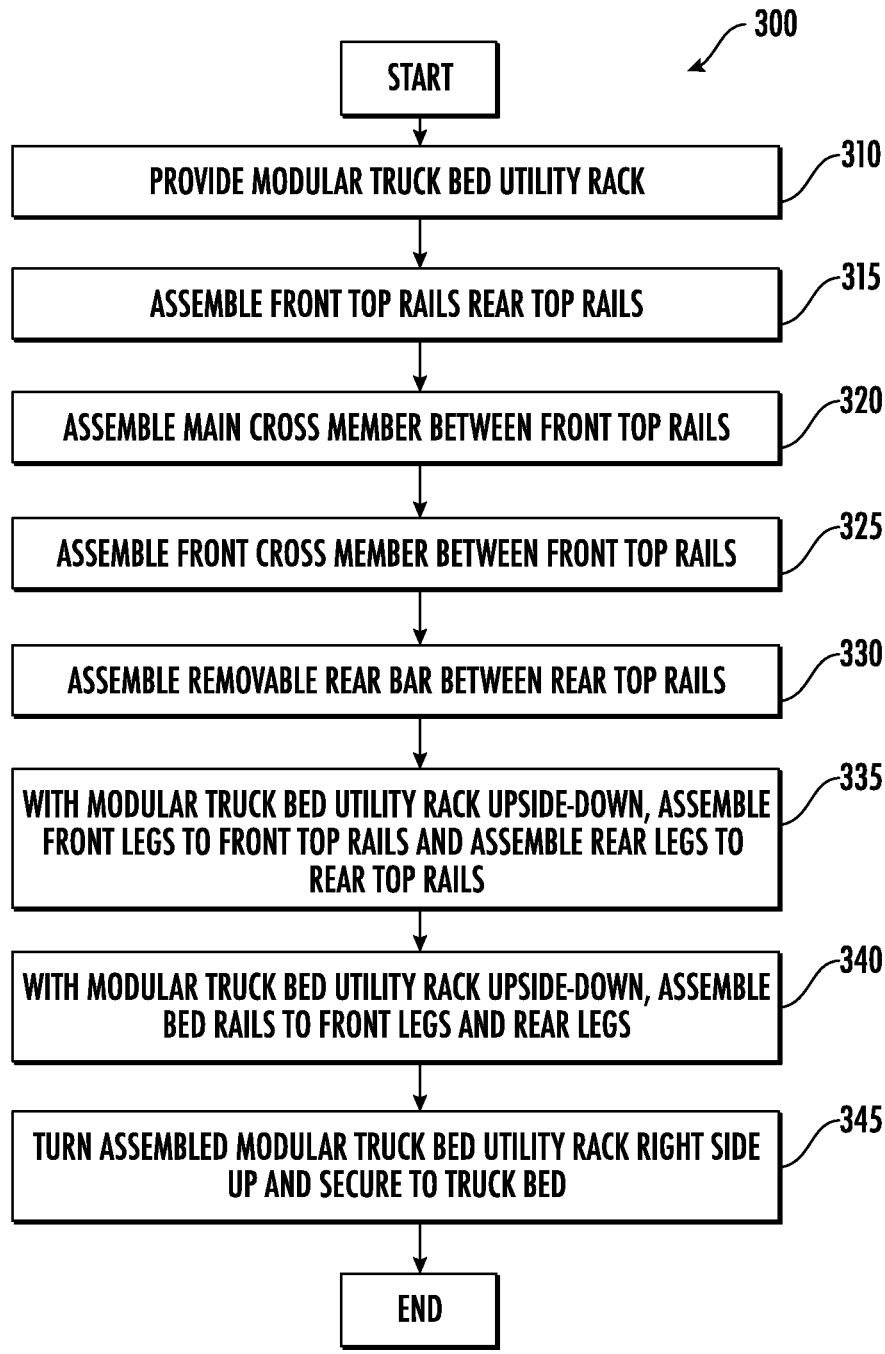
Figure 27:
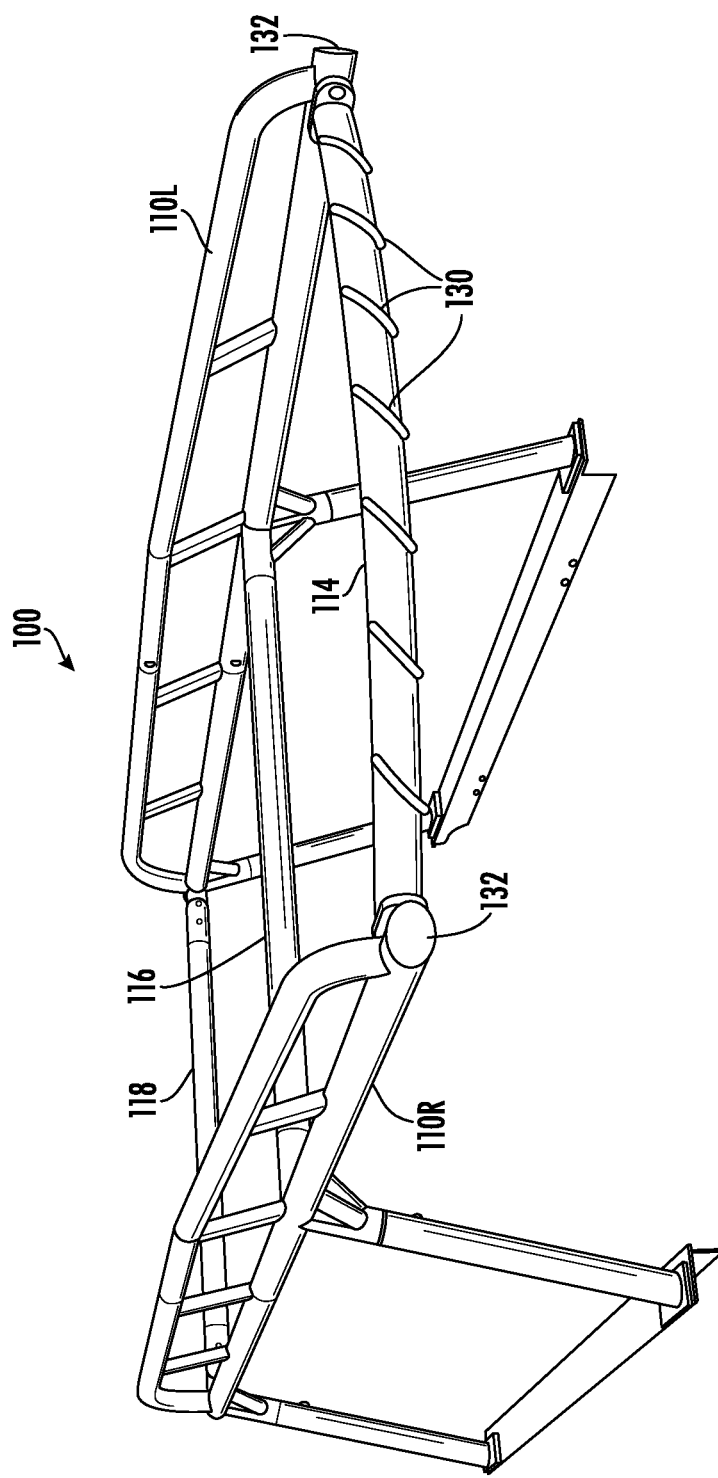
Figure 28:
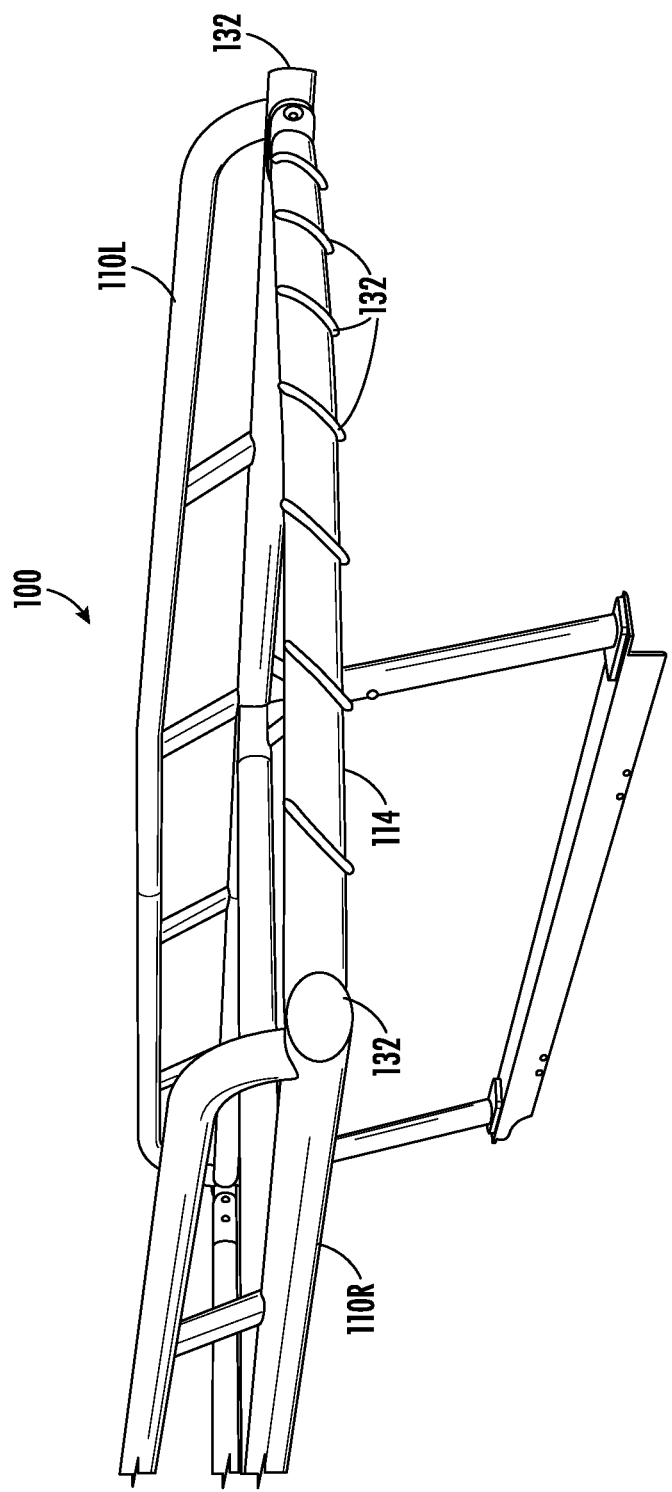
Figure 29:
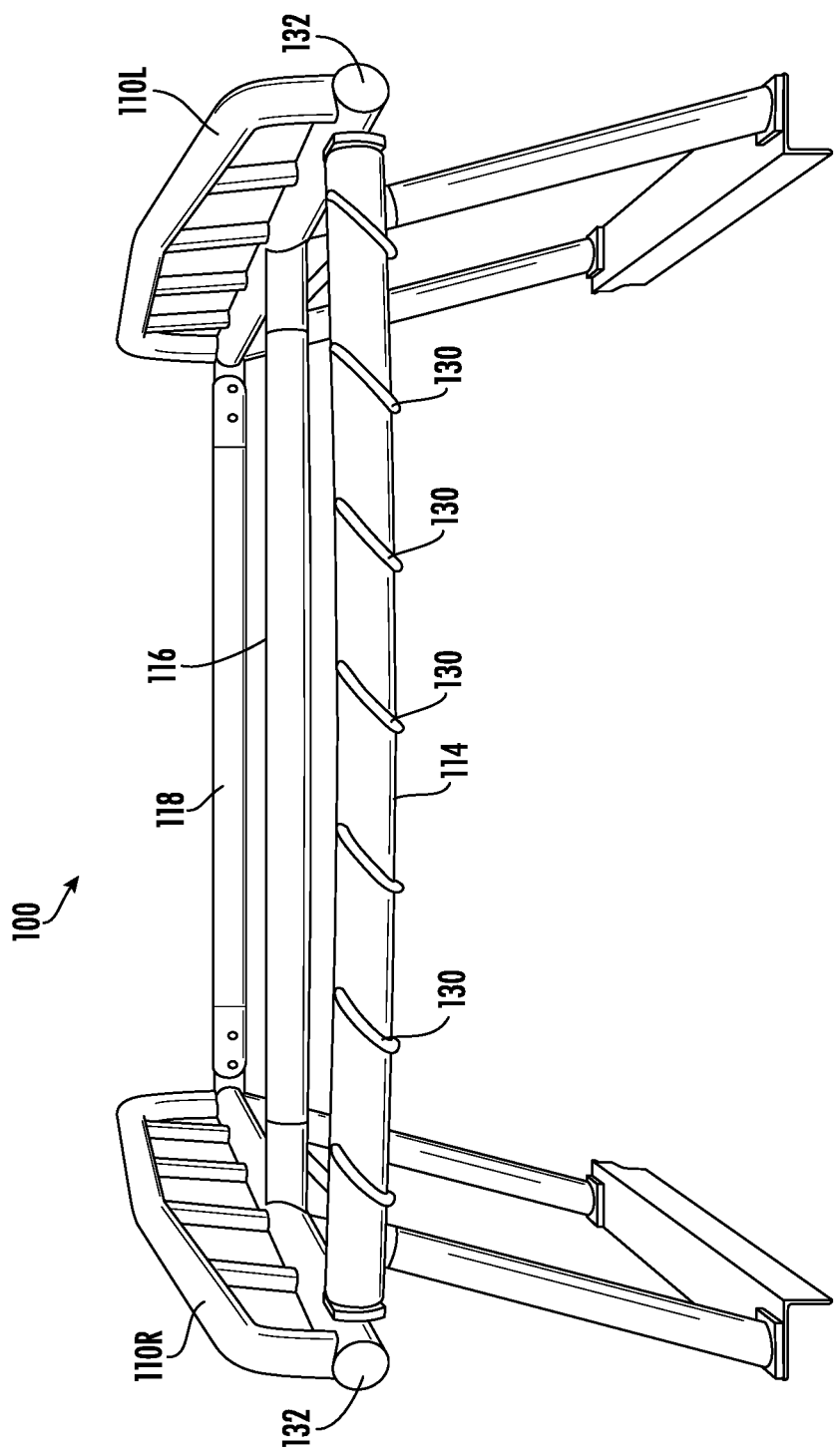

Having thus described the presently disclosed subject matter in general terms, reference will now be made to the accompanying drawings, which are not necessarily drawn to scale, and wherein:

FIG. 1 illustrates a side view of an example of the modular utility rack installed on an example pickup style truck in accordance with an embodiment of the invention;

FIG. 2 illustrates an isometric view of an example of a modular utility rack in accordance with an embodiment of the invention;

FIG. 3, FIG. 4, and FIG. 5 illustrate a top view, a side view, and a back view, respectively, of the modular utility rack shown in FIG. 1 and FIG. 2 in accordance with an embodiment of the invention;

FIG. 6 illustrates an exploded view of the modular utility rack shown in FIG. 1 and FIG. 2;

FIG. 7 illustrates a detailed assembly drawing of a front cross member of the modular utility rack shown in FIG. 1 and FIG. 2;

FIG. 8 illustrates a detailed assembly drawing of a removable rear bar of the modular utility rack shown in FIG. 1 and FIG. 2;

FIG. 9 illustrates an isometric view of the front top rails in relation to and separated from the rear top rails of the modular utility rack shown in FIG. 1 and FIG. 2;

FIG. 10 shows a detailed drawing, Detail A, of FIG. 9;

FIG. 11 illustrates a detailed assembly drawing of two bed rails in relation to the modular utility rack shown in FIG. 1 and FIG. 2;

FIG. 12 shows a detailed drawing, Detail A, of FIG. 11;

FIG. 13 illustrates an isometric view, a side view, and a bottom view of an example of the bed rail of the modular utility rack shown in FIG. 1 and FIG. 2;

FIG. 14 shows a detailed drawing, Detail A, of FIG. 13;

FIG. 15 shows a detailed drawing, Detail B, of FIG. 13;

FIG. 16 shows a detailed drawing, Detail C, of FIG. 13;

FIG. 17 illustrates a detailed assembly drawing of an example of the leg mounting pad of the modular utility rack shown in FIG. 1 and FIG. 2;

FIG. 18 shows top views of the modular utility rack in relation to the truck bed in accordance with an embodiment of the invention;

FIG. 19 shows detailed drawings, Detail A and Detail C, of FIG. 18;

FIG. 20 shows detailed drawings, Detail B and Detail D, of FIG. 18;

FIG. 21 shows an isometric view of one leg of the modular utility rack in relation to the truck bed in accordance with an embodiment of the invention;

FIG. 22 illustrates an isometric view of an example of a modular utility rack in accordance with an embodiment of the invention;

FIG. 23, FIG. 24, and FIG. 25 illustrate a top view, a side view, and a back view, respectively, of the modular utility rack shown in FIG. 22;

FIG. 26 illustrates a flow diagram of an example of a method of using the modular utility rack in accordance with an embodiment of the invention; and FIG. 27, FIG. 28, and FIG. 29 illustrate various perspective views showing an example of wind deflectors arranged on the front cross member of the modular utility rack.

DETAILED DESCRIPTION

The presently disclosed subject matter now will be described more fully hereinafter with reference to the accompanying drawings, in which some, but not all embodiments of the presently disclosed subject matter are shown. Like numbers refer to like elements throughout. The presently disclosed subject matter may be embodied in many different forms and should not be construed as limited to the embodiments set forth herein; rather, these embodiments are provided so that this disclosure will satisfy applicable legal requirements. Indeed, many modifications and other embodiments of the presently disclosed subject matter set forth herein will come to mind to one skilled in the art to which the presently disclosed subject matter pertains having the benefit of the teachings presented in the foregoing descriptions and the associated Drawings. Therefore, it is to be understood that the presently disclosed subject matter is not to be limited to the specific embodiments disclosed and that modifications and other embodiments are intended to be included within the scope of the appended claims.

In some embodiments, the presently disclosed subject matter provides a modular utility rack and method. In some embodiments, the presently disclosed modular utility rack and method may be used with pickup trucks of various makes, models and sizes.

In some embodiments, the presently disclosed modular utility rack may include, for example, a pair of front top rails, a pair of rear top rails, a front cross member arranged between the front top rails, a main cross member also arranged between the front top rails, a removable rear bar arranged between the rear top rails, a pair of front legs, a pair of rear legs, a pair of bed rails, and multiple bed rail mounting brackets.

In some embodiments, the presently disclosed modular utility rack may include components that may be easily assembled and/or disassembled for easy shipping, handling, and/or storing.

In some embodiments, the presently disclosed modular utility rack provides a collection of interchangeable components that may be selected and arranged to correspond to truck beds of different sizes and/or makes and models.

In some embodiments, the presently disclosed modular utility rack includes components that may be sized and arranged for installation on a 6.5-foot long (or 77-inch long) truck bed.

In some embodiments, the presently disclosed modular utility rack includes components that may be sized and arranged for installation on an 8-foot long (or 96-inch long) truck bed.

In some embodiments, the lengths of the front cross member, the main cross member, and the removable rear bar of the presently disclosed modular utility rack may be selectable to correspond to truck beds of varying widths.

In some embodiments, the lengths of the front legs and rear legs of the presently disclosed modular utility rack may be selectable to provide truck bed utility racks of varying height to accommodate, for example, a truck cap, camper shell, and the like.

In some embodiments, the presently disclosed modular utility rack includes an arrangement of wind deflectors on the front cross member, wherein the wind deflectors are used to deviate winds at high speeds and substantially reduce or entirely eliminate noise vibrations.

In some embodiments, the presently disclosed modular utility rack may offer greater style and/or strength as compared with conventional truck bed utility racks.

In some embodiments, the presently disclosed modular utility rack may be installed and used with other vehicles and/or trailers of various makes, models and sizes.

Additionally, a method of using the presently disclosed modular utility rack is provided.

Referring now to FIG. 1 is a side view of an example of the presently disclosed modular utility rack 100 installed on a pickup truck 190 and wherein pickup truck 190 has a cab 192 and a truck bed 194 that, for example, may be about 6.5-feet (or 77-inches) long. A rear portion of modular utility rack 100 may be mechanically fastened to truck bed 194, while a front portion of modular utility rack 100 extends over cab 192 while not being attached to cab 192.

Referring now to FIG. 2 is an isometric view of an example of the presently disclosed modular utility rack 100 and wherein the components of this example of modular utility rack 100 are sized and arranged for installation on a truck bed of a pickup style truck, for example having about a 6.5-foot long (or 77-inch long) truck bed.

Further, FIG. 3, FIG. 4, and FIG. 5 show a top view, a side view, and a back view, respectively, of the modular utility rack 100 shown in FIG. 1 and FIG. 2. In this example, modular utility rack 100 may include a pair of opposing front top rails 110, a pair of opposing rear top rails 112, a front cross member 114 arranged between front top rails 110, a main cross member 116 also arranged between the front top rails 110, a removable rear bar 118 arranged between the rear top rails 112, a pair of front legs 120, a pair of rear legs 122, a pair of opposing bed rails 126, and multiple bed rail mounting brackets 128.

More specifically, the pair of opposing front top rails 110 may include, for example, a right front top rail 110R and a left front top rail 110L. The pair of opposing rear top rails 112 may include, for example, a right rear top rail 112R and a left rear top rail 112L. The pair of front legs 120 may include, for example, a right front leg 120R and a left front leg 120L. The pair of rear legs 122 may include, for example, a right rear leg 122R and a left rear leg 122L. The pair of opposing bed rails 126 may include, for example, a right bed rail 126R and a left bed rail 126L. Further, the lower end of each of right front leg 120R, left front leg 120L, right rear leg 122R, and left rear leg 122L may include a mounting pad 124. Accordingly, modular utility rack 100 may include four mounting pads 124.

FIG. 3, FIG. 4, and FIG. 5 show, for example, dimensions of the presently disclosed modular utility rack 100 that correlate to fitting a 6.5-foot long (or 77-inch long) truck bed. For example, modular utility rack 100 is characterized by the length of the rear portion being in the range of about 77 to about 80 inches long (see FIG. 4), the length of the forward portion that extends over the truck cab being in the range of about 70 inches long (see FIG. 4), and a height (per front legs 120 and rear legs 122) being in the range of about 25 inches (see FIG. 5).

Additionally, the width of modular utility rack 100 may vary by varying the length of front cross member 114, main cross member 116, and removable rear bar 118. Namely, a selection of interchangeable front cross members 114, main cross members 116, and removable rear bars 118 may be provided that allows modular utility rack 100 to be made wider or narrower. For example, wider racks may be utilized for fitting around a topper, truck cap, or camper shell, while narrower racks may be utilized for fitting smaller/compact trucks.

Referring now to FIG. 6 is an exploded view of the modular utility rack 100 shown in FIG. 1 and FIG. 2.

Referring now to FIG. 7 is a detailed assembly drawing of front cross member 114 of the modular utility rack 100 shown in FIG. 1 and FIG. 2. Namely, FIG. 7 shows details of one end of front cross member 114 connecting to right front top rail 110R.

Referring now to FIG. 8 is a detailed assembly drawing of removable rear bar 118 of the modular utility rack 100 shown in FIG. 1 and FIG. 2. Namely, FIG. 8 shows details of one end of removable rear bar 118 connecting to right rear top rail 112R.

Referring now to FIG. 9 is an isometric view of front top rails 110 in relation to and separated from rear top rails 112 of the modular utility rack 100 shown in FIG. 1 and FIG. 2. Further, FIG. 10 is a detailed drawing, Detail A, of FIG. 9. Namely, FIG. 10 shows the alignment of the two segments of left front top rail 110L in relation to the two segments of left rear top rail 112L.

Referring now to FIG. 11 is a detailed assembly drawing of bed rails 126L and 126R in relation to the modular utility rack 100 shown in FIG. 1 and FIG. 2. Further, FIG. 12 is a detailed drawing, Detail A, of FIG. 11. Namely, FIG. 12 shows left front leg 120L with its leg mounting pad 124 in relation to left bed rail 126L. FIG. 12 also shows one bed rail mounting bracket 128 in relation to left bed rail 126L.

Referring now to FIG. 13 is an isometric view, a side view, and a bottom view of an example of one bed rail 126 of the modular utility rack 100 shown in FIG. 1 and FIG. 2. Namely, FIG. 13 shows more details of left bed rail 126L. Further, FIG. 14 is a detailed drawing, Detail A, of FIG. 13, which is a side view of the rearmost end of left bed rail 126L showing more details thereof. Further, FIG. 15 is a detailed drawing, Detail B, of FIG. 13, which is a top view of the rearmost end of left bed rail 126L showing more details thereof. Further, FIG. 16 is a detailed drawing, Detail C, of FIG. 13, which is a top view of the forward most end of left bed rail 126L showing more details thereof.

Referring now to FIG. 17 is a detailed assembly drawing of an example of one leg mounting pad 124 of the modular utility rack 100 shown in FIG. 1 and FIG. 2. Namely, FIG. 17 shows left front leg 120L with its leg mounting pad 124 in relation to left bed rail 126L.

Referring now to FIG. 18 is top views of the presently disclosed modular utility rack 100 in relation to a truck bed, such as truck bed 194 shown in FIG. 1. Further, FIG. 19 is detailed drawings, Detail A and Detail C, of FIG. 18. Namely, Detail A shows details of modular utility rack 100 at the front left corner of truck bed 194 and Detail C shows details of modular utility rack 100 at the front right corner of truck bed 194. Further, FIG. 20 is detailed drawings, Detail B and Detail D, of FIG. 18. Namely, Detail B shows details of modular utility rack 100 at the rear left corner of truck bed 194 and Detail D shows details of modular utility rack 100 at the rear right corner of truck bed 194.

Referring now to FIG. 21 is an isometric view of one leg of the presently disclosed modular utility rack 100 in relation to the truck bed, such as truck bed 194 shown in FIG. 1. For example, FIG. 21 shows left rear leg 122L and left bed rail 126L installed on the upper edge of truck bed 194.

Referring now to FIG. 22 is an isometric view of a modular utility rack 800, which is another example of the presently disclosed modular utility rack. Namely, the components of modular utility rack 800 are sized and arranged for installation on truck bed of a pickup style truck having for example about an 8-foot long (or 96-inch long) truck bed.

Referring now to FIG. 23, FIG. 24, and FIG. 25 is a top view, a side view, and a back view, respectively, of the modular utility rack 800 shown in FIG. 22. FIG. 23, FIG. 24, and FIG. 25 show, for example, dimensions of the presently disclosed modular utility rack 800 that correlate to fitting about an 8-foot long (or 96-inch long). For example, modular utility rack 800 is characterized by the length of the rear portion being in the range of about 95 inches to about 100 inches long (see FIG. 24), the length of the forward portion that extends over the truck cab being in the range of about 50 inches long (see FIG. 24), and a height (per front legs 120 and rear legs 122) being in the range of about 28 inches (see FIG. 25).

Additionally, the width of modular utility rack 800 may vary by varying the length of front cross member 114, main cross member 116, and removable rear bar 118. Namely, a selection of interchangeable front cross members 114, main cross members 116, and removable rear bars 118 may be provided that allows modular utility rack 800 to be made wider or narrower. Again, wider racks may be utilized for fitting around a topper or camper shell, while narrower racks may be utilized for fitting smaller/compact trucks.

Modular utility rack 100 shown hereinabove with reference to FIG. 1 through FIG. 21 for fitting about a 6.5-foot long (or 77-inch long) truck bed and modular utility rack 800 shown hereinabove with reference to FIG. 22 through FIG. 25 for fitting about an 8-foot long (or 96-inch long) truck bed is an example of interchangeable components of the presently disclosed modular utility rack that may be selected and arranged to correspond to truck beds of different sizes and/or makes and models.

Further, all dimensions in the Figures are in one example in inches and are non-limiting examples only, and may be less than or greater than the values indicated as may be necessary to accommodate different styles and makes of truck beds.

Referring now to FIG. 26 is a flow diagram of an example of a method 300 of using the presently disclosed modular utility rack 100. Method 300 may include, but is not limited to, one or more of the below steps, which are not necessarily listed in order of performance. That is, some steps may or may not be needed and/or may be needed (or preferred) to be conducted in a different order.

At a step 310, the presently disclosed modular utility rack is provided. In one example, the modular utility rack 100 for fitting about a 6.5-foot long (or 77-inch long) truck bed and that is shown and described hereinabove with reference to FIG. 1 through FIG. 21 is provided. In another example, the modular utility rack 800 for fitting about an 8-foot long (or 96-inch long) truck bed and that is shown and described hereinabove with reference to FIG. 22 through FIG. 25 is provided.

At a step 315, front top rails 110 may be assembled to rear top rails 112. Namely, left front top rail 110L may be assembled to left rear top rail 112L and right front top rail 110R may be assembled to right rear top rail 112R.

At a step 320, main cross member 116 may be assembled between front top rails 110. Namely, main cross member 116 may be assembled between left front top rail 110L and right front top rail 110R.

At a step 325, front cross member 114 may be assembled between front top rails 110. Namely, front cross member 114 may be assembled between left front top rail 110L and right front top rail 110R.

At a step 330, removable rear bar 118 may be assembled between rear top rails 112. Namely, removable rear bar 118 may be assembled between left rear top rail 112L and right rear top rail 112R.

At a step 335, front legs 120 may be assembled to front top rails 110 and rear legs 122 may be assembled to rear top rails 112. Namely, left front leg 120L may be assembled to left front top rail 110L, right front leg 120R may be assembled to right front top rail 110R, left rear leg 122L may be assembled to left rear top rail 112L, and right rear leg 122R may be assembled to right rear top rail 112R. In one embodiment, this step may be performed with the current rack assembly in the upside-down position for ease of installation.

At a step 340, bed rails 126 may be assembled to front legs 120 and rear legs 122. Namely, right bed rail 126R may be assembled to right front leg 120R and to right rear leg 122R. Further, left bed rail 126L may be assembled to left front leg 120L and to left rear leg 122L. Again, in one embodiment, this step may be performed with the current rack assembly in the upside-down position for ease of installation.

At a step 345, the assembled modular utility rack, if up-side down, may be turned right side up and then secured to the truck bed. For example, the assembled modular utility rack 100/800, if up-side down, is turned right side up. Then, right bed rail 126R and left bed rail 126L may be clamped to the top of the truck bed (e.g., truck bed 194 of FIG. 1) using multiple bed rail mounting brackets 128.

Referring now to FIG. 27, FIG. 28, and FIG. 29 is various perspective views showing an example of wind deflectors 130 arranged on front cross member 114 of the presently disclosed modular utility rack 100. Namely, an arrangement of multiple wind deflectors 130 are distributed along the length of front cross member 114.

Wind deflectors 130 are used to deviate winds at high speeds and substantially reduce or entirely eliminate noise vibrations. In one example, each of the wind deflectors 130 may be a ⅜-inch (or other suitable size) aluminum rod that is welded at an angle to front cross member 114. The angle may be in the range from about 35 degrees to about 55 degrees in one example, or may be about 45 degrees in another example. Further, the spacing between wind deflectors 130 may be in the range from about 7 inches to about 8 inches in one example, or may be about 7⁷⁄₁₆ inches in another example.

Additionally, both the forward-most member of right front top rail 110R and the forward-most member of left front top rail 110L may have an end face 132. Each of the end faces 132 may be angled and textured to provide the desired look, style, and/or design.

Following long-standing patent law convention, the terms "a," "an," and "the" refer to "one or more" when used in this application, including the claims. Thus, for example, reference to "a subject" includes a plurality of subjects, unless the context clearly is to the contrary (e.g., a plurality of subjects), and so forth.

Throughout this specification and the claims, the terms "comprise," "comprises," and "comprising" are used in a non-exclusive sense, except where the context requires otherwise. Likewise, the term "include" and its grammatical variants are intended to be non-limiting, such that recitation of items in a list is not to the exclusion of other like items that can be substituted or added to the listed items.

For the purposes of this specification and appended claims, unless otherwise indicated, all numbers expressing amounts, sizes, dimensions, proportions, shapes, formulations, parameters, percentages, quantities, characteristics, and other numerical values used in the specification and claims, are to be understood as being modified in all instances by the term "about" even though the term "about" may not expressly appear with the value, amount or range. Accordingly, unless indicated to the contrary, the numerical parameters set forth in the following specification and attached claims are not and need not be exact, but may be approximate and/or larger or smaller as desired, reflecting tolerances, conversion factors, rounding off, measurement error and the like, and other factors known to those of skill in the art depending on the desired properties sought to be obtained by the presently disclosed subject matter. For example, the term "about," when referring to a value can be meant to encompass variations of, in some embodiments ±100%, in some embodiments ±50%, in some embodiments ±20%, in some embodiments ±10%, in some embodiments ±5%, in some embodiments ±1%, in some embodiments ±0.5%, and in some embodiments ±0.1% from the specified amount, as such variations are appropriate to perform the disclosed methods or employ the disclosed compositions.

Further, the term "about" when used in connection with one or more numbers or numerical ranges, should be understood to refer to all such numbers, including all numbers in a range and modifies that range by extending the boundaries above and below the numerical values set forth. The recitation of numerical ranges by endpoints includes all numbers, e.g., whole integers, including fractions thereof, subsumed within that range (for example, the recitation of 1 to 5 includes 1, 2, 3, 4, and 5, as well as fractions thereof, e.g., 1.5, 2.25, 3.75, 4.1, and the like) and any range within that range.

Although the foregoing subject matter has been described in some detail by way of illustration and example for purposes of clarity of understanding, it will be understood by those skilled in the art that certain changes and modifications can be practiced within the scope of the appended claims.

That which is claimed:

1. A modular utility rack, the modular utility rack comprising:
    a first pair of opposing front top rails, wherein the first pair of opposing front top rails are configured to extend over at least a portion of a cab of a truck;
    a front cross member arranged between a front portion of the first pair of opposing front top rails and releasable connected to each top rail of the first pair of opposing front top rails; wherein the front cross member is bow shaped;
    a second cross member arranged between a rear portion of the first pair of opposing front top rails and releasable connected to each top rail of the first pair of opposing front top rails;
    a second pair of opposing front top rails connected to the first pair of opposing front top rails, wherein a first one of the second pair of opposing front top rails is spaced vertically apart from the first one of the first pair of opposing front top rails and a second one of the second pair of opposing front top rails is spaced vertically apart from the second one of the first pair of opposing front top rails, wherein each of the front top rails of the second pair of opposing front top rails are spaced vertically apart from their corresponding ones of the front top rails of the first pair of opposing front top rails by a plurality of vertical support members, wherein the vertical support members are spaced apart from one another along a length between the front cross member and the second cross member;
    a first pair of opposing rear top rails, wherein the first pair of opposing rear top rails are configured to extend over at least a portion of a bed of the truck, and wherein a first one of the first pair of opposing front top rails and a first one of the first pair of opposing rear top rails are horizontally aligned in an end to end configuration and releasable attached to one another, and a second one of the first pair of opposing front top rails and a second one of the first pair of opposing rear top rails are horizontally aligned in an end to end configuration and releasable attached to one another;
    a second pair of opposing rear top rails connected to the first pair of opposing rear top rails, wherein a first one of the second pair of opposing rear top rails is spaced vertically apart from the first one of the pair of opposing rear top rails and a second one of the second pair of opposing rear top rails is spaced vertically apart from the second one of the rear pair of opposing front top rails, and wherein a first one of the second pair of opposing front top rails and a first one of the second pair of opposing rear top rails are horizontally aligned in an end to end configuration and releasable attached to one another, and a second one of the second pair of opposing front top rails and a second one of the second pair of opposing rear top rails are horizontally aligned in an end to end configuration and releasable attached to one another;
    a rear cross member arranged between the first one and second one of the first pair of opposing rear top rails or the first one and second one of the second pair of opposing rear top rails and releasable connected to each one of the first one and second one of the first pair of opposing rear top rails or the first one and second one of the second pair of opposing rear top rails, respectively;
    a pair of front legs;
    a pair of rear legs; and
    a pair of opposing bed rails, wherein each leg of the pair of front legs is attached to a front top rail of the first pair of opposing front top rails and to a bed rail and each leg of the pair of rear legs is attached to a rear top rail of the first pair of opposing rear top rails and a bed rail.

2. The modular utility rack of claim 1 further comprising:
    one or more bed rail mounting brackets attached to a bed rail and configured to mount the utility rack to the bed of the truck without modifying the bed of the truck.

3. The modular utility rack of claim 2, wherein each of the one or more bed rail mounting brackets is attached to a bed rail in close proximity to where a front leg or a rear leg attaches to the bed rail.

4. The modular utility rack of claim 1, wherein the front cross member has a substantial uniform bow shape along its length and the rear cross member is removable.

5. The modular utility rack of claim 4, wherein each rail of the first pair of opposing rear top rails includes a mounting portion configured to attach the rear cross member thereto.

6. The modular utility rack of claim 5, wherein the rear cross member comprises one or more holes at each end and the rear cross member is connected to the mounting portion by placing a pin through each hole of the one or more holes.

7. The modular utility rack of claim 1, wherein the first one of the first pair of opposing front top rails comprises a right front top rail and the second one of the first pair of opposing front top rails comprises a left front top rail.

8. The modular utility rack of claim 7, wherein the first one of the first pair of opposing rear top rails comprises a right rear top rail and the second one of the first pair of opposing rear top rails comprises a left rear top rail.

9. The modular utility rack of claim 8, wherein the right rear top rail is connected to the right front top rail and the left rear top rail is connected to the left front top rail.

10. The modular utility rack of claim 9, wherein the right rear top rail includes at least one hole near an end thereof and passing transverse therethrough, and the end of the rear front top rail fits inside an interior of an end of the right front top rail, wherein the right rear top rail includes at least one hole near the end thereof and passing transverse therethrough, and is connected to the right front top rail by sliding the end of the right rear top rail into the end of the right front top rail such that the holes are aligned and inserting a fastening device through the holes.

11. The modular utility rack of claim 10, wherein the fasting device is a screw, a bolt, or a pin.

12. The modular utility rack of claim 8, wherein the pair of opposing bed rails includes a right bed rail and a left bed rail.

13. The modular utility rack of claim 12, wherein the pair of front legs comprises a right front leg and a left front leg, wherein the right front leg is attached to the right front top rail and the right bed rail, and the left front leg is attached to the left front top rail and the left bed rail.

14. The modular utility rack of claim 13, wherein the pair of rear legs comprises a right rear leg and a left rear leg, wherein the right rear leg is attached to right rear top rail and the right bed rail, and the left front leg is attached to the left rear top rail and the left bed rail.

15. The modular utility rack of claim 14, wherein each of the front legs and the rear legs are attached to the bed rails by a mounting bracket.

16. The modular utility rack of claim 1 further comprising:
   at least two bed rail mounting brackets, wherein each bed rail is attached to the bed of the truck by utilizing one or more bed rail mounting brackets to attach the bed rail to the truck bed.

17. The modular utility rack of claim 1, further comprising:
   one or more wind deflectors disposed on the front cross member, wherein the wind deflector is configured to deviate wind and/or reduce noise vibration.

18. The modular utility rack of claim 1, wherein the vertical support members are cantered in a rearward direction.

19. A modular utility rack, the modular utility rack comprising:
   a first pair of opposing front top rails, wherein the first pair of opposing front top rails are configurable to extend over at least a portion of a front portion of a vehicle;
   a front cross member arrangeable between the first pair of opposing front top rails and releasable connectable to each top rail of the first pair of opposing front top rails; wherein the front cross member is bow shaped;
   a second cross member arrangeable between the first pair of opposing front top rails and releasable connectable to each top rail of the first pair of opposing front top rails;
   a second pair of opposing front top rails connected to the first pair of opposing front top rails, wherein a first one of the second pair of opposing front top rails is spaced vertically apart from the first one of the first pair of opposing front top rails and a second one of the second pair of opposing front top rails is spaced vertically apart from the second one of the first pair of opposing front top rails, wherein each of the front top rails of the second pair of opposing front top rails are spaced vertically apart from their corresponding ones of the front top rails of the first pair of opposing front top rails by a plurality of vertical support members, wherein the plurality of vertical support members are spaced apart from one another along a length between the front cross member and the second cross member;
   a first pair of opposing rear top rails, wherein the first pair of opposing rear top rails are configurable to extend over at least a portion of a rear portion of a vehicle, and wherein a first one of the first pair of opposing front top rails and a first one of the first pair of opposing rear top rails are configured to be horizontally aligned in an end to end configuration and releasable attachable to one another, and a second one of the first pair of opposing front top rails and a second one of the first pair of opposing rear top rails are configured to be horizontally aligned in an end to end configuration and releasable attachable to one another;
   a second pair of opposing rear top rails connected to the first pair of opposing rear top rails, wherein a first one of the second pair of opposing rear top rails is spaced apart from and substantially parallel with the first one of the pair of opposing rear top rails and a second one of the second pair of opposing rear top rails is spaced apart and substantially parallel with the second one of the rear pair of opposing front top rails, and wherein a first one of the second pair of opposing front top rails and a first one of the second pair of opposing rear top rails are configured to be horizontally aligned in an end to end configuration and releasable attachable to one another, and a second one of the second pair of opposing front top rails and a second one of the second pair of opposing rear top rails are configured to be horizontally aligned in an end to end configuration and releasable attachable to one another;
   a rear cross member arrangeable between the first one and second one of the first pair of opposing rear top rails or the first one and second one of the second pair of opposing rear top rails and releasable connectable to each one of the first one and second one of the first pair of opposing rear top rails or the first one and second one of the second pair of opposing rear top rails, respectively;
   a pair of front legs;
   a pair of rear legs; and
   a pair of opposing bed rails, wherein each leg of the pair of front legs is attachable to a front top rail of the first pair of opposing front top rails and to a bed rail and each leg of the pair of rear legs is attachable to a rear top rail of the first pair of opposing rear top rails and a bed rail.

20. The modular utility rack of claim 19, wherein the front cross member further comprises one or more wind deflectors disposed on the front cross member, wherein the wind deflector is configured to deviate wind and/or reduce noise vibration.

21. The modular utility rack of claim 19, wherein the vertical support members are cantered in a rearward direction.

* * * * *